US007801981B2

(12) United States Patent
Setogawa et al.

(10) Patent No.: US 7,801,981 B2
(45) Date of Patent: Sep. 21, 2010

(54) REMOTE MONITORING SYSTEM, REMOTE MONITORING METHOD FOR ELECTRONIC APPARATUS, LOW ORDER MONITORING APPARATUS, NOTIFICATION METHOD OF APPARATUS MONITORING INFORMATION, HIGH ORDER MONITORING APPARATUS, COMMUNICATION METHOD OF MAINTENANCE DATA, PROGRAM AND RECORDING MEDIUM

(75) Inventors: Toshiaki Setogawa, Kanagawa (JP); Yozo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1283 days.

(21) Appl. No.: 10/983,037

(22) Filed: Nov. 8, 2004

(65) Prior Publication Data
US 2005/0198278 A1 Sep. 8, 2005

(30) Foreign Application Priority Data
Nov. 12, 2003 (JP) .............................. 2003-382270

(51) Int. Cl.
G06F 15/173 (2006.01)
G06F 15/16 (2006.01)
(52) U.S. Cl. ........................ 709/224; 709/203; 709/228; 713/100
(58) Field of Classification Search ................. 709/221, 709/224, 228, 251, 223, 203; 455/115.1; 700/55
See application file for complete search history.

(56) References Cited
U.S. PATENT DOCUMENTS

| 5,651,113 | A | * | 7/1997 | Lin et al. ....................... 714/56 |
| 5,920,477 | A | * | 7/1999 | Hoffberg et al. ............ 382/181 |
| 5,935,218 | A | * | 8/1999 | Beyda et al. ................. 709/251 |
| 6,118,834 | A | * | 9/2000 | Rasanen ....................... 375/372 |
| 6,681,139 | B1 | * | 1/2004 | Ohashi et al. ................... 700/55 |
| 6,708,069 | B2 | * | 3/2004 | Ohashi et al. ................... 700/55 |
| 6,813,654 | B1 | * | 11/2004 | Ishibashi ....................... 710/36 |
| 6,985,945 | B2 | * | 1/2006 | Farhat et al. ................. 709/224 |
| 6,996,130 | B2 | * | 2/2006 | Ohashi et al. ................. 370/497 |
| 7,006,881 | B1 | * | 2/2006 | Hoffberg et al. ............... 700/83 |
| 7,123,888 | B2 | * | 10/2006 | Nawata ..................... 455/115.1 |
| 2001/0042119 | A1 | | 11/2001 | Urano et al. |
| 2003/0041137 | A1 | | 2/2003 | Horie et al. |
| 2003/0097442 | A1 | * | 5/2003 | Farhat et al. ................. 709/224 |

(Continued)

FOREIGN PATENT DOCUMENTS

FR 2 660 781 10/1991

(Continued)

*Primary Examiner*—Khanh Q Dinh
(74) *Attorney, Agent, or Firm*—Oblon, Spivak, McClelland, Maier & Neustadt, L.L.P.

(57) ABSTRACT

A technique is disclosed which makes it possible to remotely monitor electronic apparatus which do not exist on a wide area network. Electronic apparatus which are used in a non-connected state to a wide area network are remotely monitored using a plurality of low order monitoring apparatus and a high order monitoring apparatus. Each of the low order monitoring apparatus issues, when a particular one of the electronic apparatus which makes an object of monitoring is connected thereto or a recording medium removed from the particular electronic apparatus is connected thereto, a notification of apparatus management information acquired from the particular electronic apparatus to the high order monitoring apparatus. The high order monitoring apparatus unitarily monitors the apparatus management information acquired through the low order monitoring apparatus.

16 Claims, 16 Drawing Sheets

U.S. PATENT DOCUMENTS

2003/0101254 A1* 5/2003 Sato .......................... 709/223
2003/0154196 A1* 8/2003 Goodwin et al. ............... 707/3

FOREIGN PATENT DOCUMENTS

| | | |
|---|---|---|
| JP | 9-134297 | 5/1997 |
| JP | 9-160803 | 6/1997 |
| JP | 2000-89818 | 3/2000 |
| JP | 2001-53779 | 2/2001 |
| JP | 2003-179541 | 6/2003 |

* cited by examiner

F I G. 7
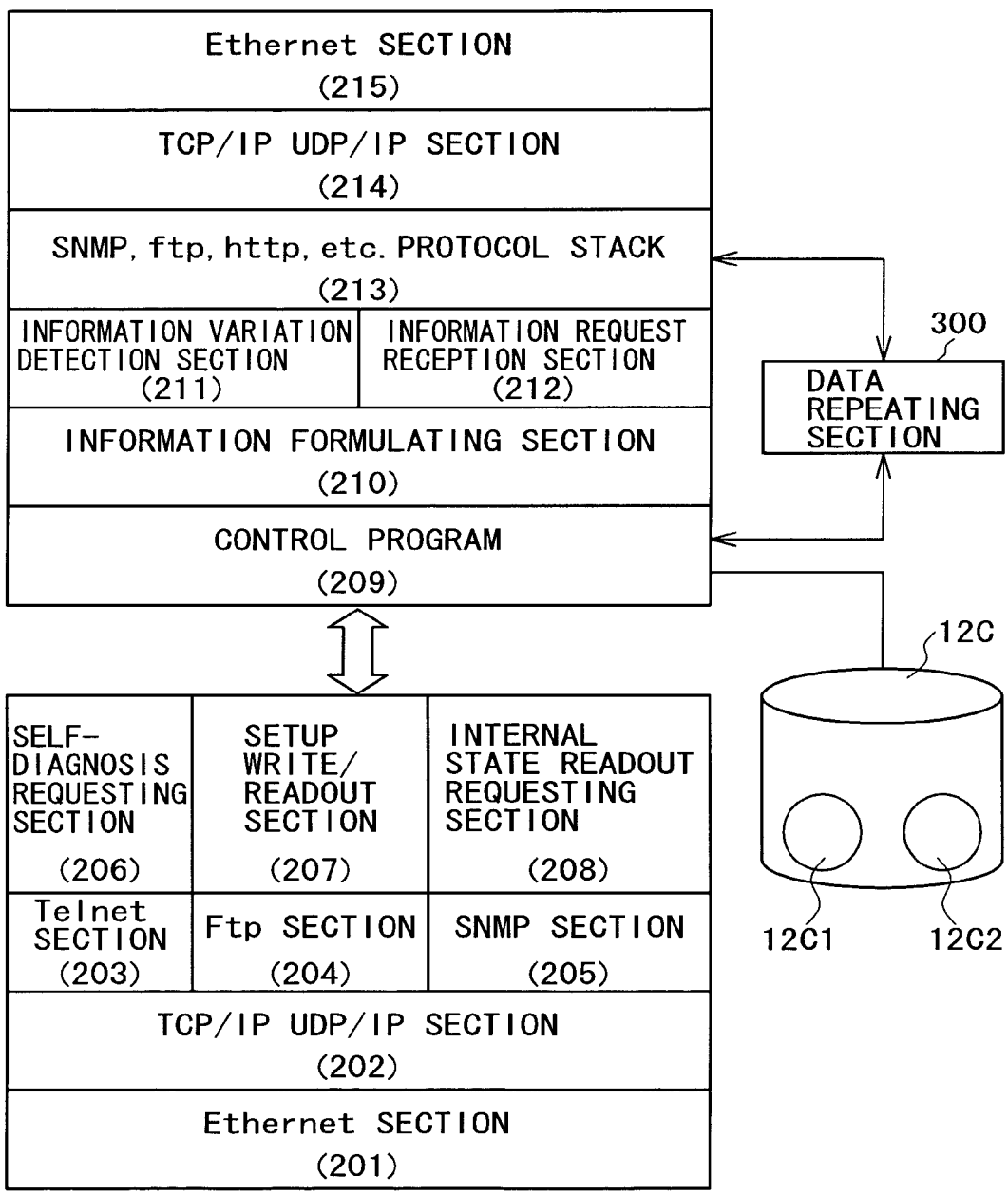

FIG. 10

| CLASSIFI-CATION | MAIN ITEM | MIDDLE ITEM | MINOR ITEM | UNIT, SUBSTANCE | DEALING WITH SELF-DIAGNOSIS | EXTERNAL SETUP |
|---|---|---|---|---|---|---|
| STATIC INFORMATION | DECK | | MODEL NAME | | | |
| | | | SERIAL NUMBER | | | |
| | BATTERY | | BATTERY MODEL NAME | | | |
| | | | TYPE | | | |
| | | | MAKER NAME | | | |
| | | | FULL CHARGE CAPACITY | wh | | |
| | | | DESIGNED CAPACITY | wh | | |
| CURRENT STATE | BATTERY | | REMAINING CAPACITY | wh | | |
| | | | CHARGING CYCLE | TIMES | | |
| | | | ESTIMATED DISCHARGE TIME | TIME | | |
| | | | VALUE | % | | |
| | VIEWFINDER | | BRIGHTNESS | SET VALUE | | OBJECT |
| | | | CONTRAST | SET VALUE | | OBJECT |
| | | | PEAKING | SET VALUE | | OBJECT |
| | | | DIOPTER SCALE ADJUSTMENT | SET VALUE | | OBJECT |
| | CAMERA | CAMERA LENS | WHITE BALANCE | SET VALUE/MODE | SELF-DIAGNOSIS REGARDING WHETHER SETTING WITHIN SPECIFICATION VARIATION RANGE IS POSSIBLE | OBJECT |
| | | | BLACK BALANCE | SET VALUE/MODE | SELF-DIAGNOSIS REGARDING WHETHER SETTING WITHIN SPECIFICATION VARIATION RANGE IS POSSIBLE | OBJECT |
| | | | AUTO BALANCE | OPERATION STATE VALUE | SELF-DIAGNOSIS REGARDING WHETHER SETTING WITHIN SPECIFICATION VARIATION RANGE IS POSSIBLE | OBJECT |
| | | | SHUTTER MODE | MODE SET VALUE | SELF-DIAGNOSIS REGARDING WHETHER SETTING WITHIN SPECIFICATION VARIATION RANGE IS POSSIBLE | OBJECT |
| | | | SHUTTER SPEED | SET VALUE/MODE | SELF-DIAGNOSIS REGARDING WHETHER SETTING WITHIN SPECIFICATION VARIATION RANGE IS POSSIBLE | OBJECT |
| | | | IRIS VALUE | SET VALUE/MODE | SELF-DIAGNOSIS REGARDING WHETHER SETTING WITHIN SPECIFICATION VARIATION RANGE IS POSSIBLE | OBJECT |
| | | VIDEO MODE | ASPECT RATIO | SET VALUE 4:3, 16:9 | SELF-DIAGNOSIS REGARDING WHETHER SETTING WITHIN SPECIFICATION VARIATION RANGE IS POSSIBLE | OBJECT |
| | | | VIDEO MODE | SET VALUE/PROGRESSIVE/INTERLACE | SELF-DIAGNOSIS REGARDING WHETHER SETTING WITHIN SPECIFICATION VARIATION RANGE IS POSSIBLE | OBJECT |
| | | | FRAME RATE | SET VALUE 24/25/30 | SELF-DIAGNOSIS REGARDING WHETHER SETTING WITHIN SPECIFICATION VARIATION RANGE IS POSSIBLE | OBJECT |
| | | INTERNAL INFORMATION | CUMULATIVE USE TIME | TIME UNIT | | |
| | | | INTERNAL TEMPERATURE | CELSIUS | | |
| | | | DEW FORMATION STATE | STATE | | |
| | DECK | AUDIO SETTING | RECORDING MODE | FS/CH etc. | SELF-DIAGNOSIS REGARDING WHETHER SETTING WITHIN SPECIFICATION VARIATION RANGE IS POSSIBLE | OBJECT |
| | | | REFERENCE LEVEL | SET VALUE | SELF-DIAGNOSIS REGARDING WHETHER SETTING WITHIN SPECIFICATION VARIATION RANGE IS POSSIBLE | OBJECT |
| | | | INPUT LEVEL | SET VALUE | SELF-DIAGNOSIS REGARDING WHETHER SETTING WITHIN SPECIFICATION VARIATION RANGE IS POSSIBLE | OBJECT |
| | | | Fader SETTING | SET VALUE (FADE IN/OUT) | SELF-DIAGNOSIS REGARDING WHETHER SETTING WITHIN SPECIFICATION VARIATION RANGE IS POSSIBLE | OBJECT |
| | | TIME CODE SETTING | FRAME MODE | 24/25/30DF/30NDF | SELF-DIAGNOSIS REGARDING WHETHER SETTING WITHIN SPECIFICATION VARIATION RANGE IS POSSIBLE | OBJECT |
| | | | GENERATOR SET VALUE | TIME CODE VALUE | SELF-DIAGNOSIS REGARDING WHETHER INTERNAL GENERATOR IS NORMAL | OBJECT |
| | | | INTERNAL/EXTERNAL LOCK | SET VALUE | SELF-DIAGNOSIS REGARDING WHETHER SETTING WITHIN SPECIFICATION VARIATION RANGE IS POSSIBLE | OBJECT |
| | | | USER BITS | SET VALUE | | OBJECT |
| | | DECK | STANDBY TIME | SET VALUE | | OBJECT |
| | | | CALENDAR/CLOCK | CURRENT STATE | | OBJECT |
| | | | INTERNAL TEMPERATURE | CELSIUS | | |
| | | | DEW FORMATION STATE | STATE | | |
| | | | CUMULATIVE USE TIME | TIME UNIT | | |
| | | | SPINDLE MOTOR USE TIME | CUMULATIVE VALUE | | |
| | | | PICKUP USE TIME | CUMULATIVE VALUE | | |
| | | | LASER OUTPUT CURRENT | CURRENT STATE/SET VALUE | MEASUREMENT RESULT OF SELF-DIAGNOSIS | |
| | | | DISK ERROR RATE | SET VALUE | MEASUREMENT RESULT OF SELF-DIAGNOSIS | |
| | | | DISK USE TIME NUMBER | NUMBER OF TIMES AT PRESENT POINT OF TIME | | |
| OPERATION LOG IN THE PAST | LOG | | OPERATION LOG | OPERATION HISTORY OF USER IS ALL RECORDED TOGETHER WITH TIME | | |
| | | | Error Rate LOG | ERROR RATE UPON RECORDING | | |
| | | | CAMERA LOG | RECORDING OF AUTOMATIC WHITE BALANCE/AUTOMATIC SHUTTER SPEED/AUTOMATIC IRIS/OTHER AUTOMATIC VARIATION PARAMETER | | |
| | | | DECK LOG | OPERATION LOG(RECORDING/REPRODUCTION, EXTRACTION etc.)/ ENVIRONMENT LOG(HUMIDITY etc.) | | |
| SELF-DIAGNOSIS COMMAND | | | AUTOMATIC RECORDING/REPRODUCING TEST | SELF-DIAGNOSIS RESULT | MEASUREMENT RESULT OF SELF-DIAGNOSIS DEALING ITEM FROM WITHIN CLASSIFICATION "CURRENT STATE" AFTER COMMAND EXECUTION | |
| SETUP COMMAND CAMERA, DECK | | | COLLECTIVE WRITING OF SET VALUE | | COLLECTIVE WRITING OF ITEMS CORRESPONDING TO EXTERNAL SETUP FROM WITHIN CLASSIFICATION "CURRENT STATE" | |

FIG. 11

| TARGET DEVICE NAME | MONITORING PROBE IP ADDRESS | ACTUAL PRESENCE FLAG |
|---|---|---|
| TARGET DEVICE NO1_ON PROBE1 | 202.100.100.100 | YES |
| TARGET DEVICE NO2_ON PROBE1 | 202.100.100.100 | NO |
| TARGET DEVICE NO3_ON PROBE2 | 202.100.100.101 | YES |
| TARGET DEVICE NO4_ON PROBE2 | 202.100.100.101 | YES |
| TARGET DEVICE NO5_ON PROBE3 | 202.100.100.102 | NO |

REMOTE MONITORING SYSTEM, REMOTE MONITORING METHOD FOR ELECTRONIC APPARATUS, LOW ORDER MONITORING APPARATUS, NOTIFICATION METHOD OF APPARATUS MONITORING INFORMATION, HIGH ORDER MONITORING APPARATUS, COMMUNICATION METHOD OF MAINTENANCE DATA, PROGRAM AND RECORDING MEDIUM

BACKGROUND OF THE INVENTION

This invention relates a remote monitoring system for monitoring apparatus management information unique to individual electronic apparatus from another place. The present invention relates also to a remote monitoring method for electronic apparatus in a remote monitoring system. The present invention further relates to a low order monitoring apparatus which directly monitors electronic apparatus and a notification method of apparatus management information to a high order monitoring apparatus.

Furthermore, the present invention relates to a high order monitoring apparatus which indirectly monitors electronic apparatus and a communication method of maintenance data to electronic apparatus. The present invention relates also to a program for implementing such low and high order monitoring apparatus as mentioned above and a recording medium on which the program is stored.

A monitoring system is currently demanded wherein electronic apparatus on hand can be maintained and operated efficiently. The present applicant discloses a monitoring system of the type, in the pamphlet of International Publication No. 03/038630.

The monitoring system is suitable to remotely monitor electronic apparatus which are normally connected to a wide area network. For example, the monitoring system is suitable to monitor editing machines or storage apparatus fixedly installed in a building. However, the monitoring technique which uses a wide area network cannot be applied to those electronic apparatus which are used in a form wherein they are disconnected from a wide area network.

It is to be noted that some of portable type electronic apparatus include a network connector. However, the connector is intended for connection of the electric apparatus to a local area network but not for connection to a wide area network. Actually, a particular technique for directly connecting an electronic apparatus of the type described to a wide area network has not been established as yet.

SUMMARY OF THE INVENTION

It is an object of the present invention to provide a remote monitoring system, a remote monitoring method of electronic apparatus, a low order monitoring apparatus, a notification method of apparatus management information, a high order monitoring apparatus, a communication method of maintenance data, a program and a recording medium by which electronic apparatus used in a non-connected state to a wide area network can be remotely monitored.

In order to attain the object described above, according to an aspect of the present invention, there is provided a remote monitoring system, including a plurality of electronic apparatus each used in a non-connected state to a wide area network, a plurality of low order monitoring apparatus each for issuing, when a particular one of the electronic apparatus which makes an object of monitoring of the low order monitoring apparatus is connected to the low order monitoring apparatus or a recording medium removed from the particular electronic apparatus is connected to the low order monitoring apparatus, a notification of apparatus management information acquired from the particular electronic apparatus through the wide area network, and one or more high order monitoring apparatus for unitarily monitoring the apparatus management information acquired through the low order monitoring apparatus.

According to another aspect of the present invention, there is provided a remote monitoring system, including a plurality of electronic apparatus each used in a non-connected state to a wide area network, one or more high order monitoring apparatus each for transmitting maintenance data unique to a particular one of the electronic apparatus which makes an object of monitoring of the high order monitoring apparatus, and a plurality of low order monitoring apparatus each for retaining, when the low order monitoring apparatus receives the maintenance data through the wide area network from that one of the high order monitoring apparatus which has the low order monitoring apparatus placed under the direct monitoring thereof, the maintenance data received from the high order monitoring apparatus until after the particular electronic apparatus which is the monitoring object of the high order monitoring apparatus is connected to the low order monitoring apparatus or a recording medium removed from the particular electronic apparatus is connected to the low order monitoring apparatus.

According to a further aspect of the present invention, there is provided a remote controlling method for electronic apparatus included in a remote monitoring system and each used in a non-connected state to a wide area network, the remote monitoring system further including a plurality of low order monitoring apparatus each for issuing a notification of apparatus management information acquired from any of the electronic apparatus and one or more high order monitoring apparatus each for unitarily monitoring the apparatus management information of the electronic apparatus acquired from the notification from any of the low order monitoring apparatus through the wide area network, including a step executed by any of the low order monitoring apparatus of issuing a request for apparatus management information to a particular one of the electronic apparatus which makes an object of monitoring or a recording medium removed from the particular electronic apparatus, and a step executed by any of the high order monitoring apparatus of issuing a request for transmission of the apparatus management information acquired by the low order monitoring apparatus to the low order monitoring apparatus.

According to a still further aspect of the present invention, there is provided a remote monitoring method for electronic apparatus included in a remote monitoring system and each used in a non-connected state to a wide area network, the remote monitoring system further including one or more high order monitoring apparatus each for transmitting maintenance data unique to a particular one of the electronic apparatus which makes an object of monitoring of the high order monitoring apparatus and a plurality of low order monitoring apparatus each for receiving the maintenance data from any of the high order monitoring apparatus through the wide area network and transmitting the received maintenance data to the particular electronic apparatus which makes an object of monitoring of the low order monitoring apparatus, including a step executed by any of the low order monitoring apparatus of retaining the maintenance data received from any of the high order monitoring apparatus until after the particular electronic apparatus which is the monitoring object of the high order monitoring apparatus is connected to the low order monitoring apparatus or a recording medium removed from the particular electronic apparatus is connected to the low order monitoring apparatus, and a step executed by the low order monitoring apparatus of transmitting, after the connection is detected, the maintenance data to the electronic apparatus or the recording medium.

According to a yet further aspect of the present invention, there is provided a low order monitoring apparatus for a remote monitoring system for monitoring a plurality of electronic apparatus each used in a non-connected state to a wide area network, including a first connection terminal for connecting to any of the electronic apparatus or a recording medium removed from the electronic apparatus, and a second connection terminal for issuing a notification of apparatus management information of the electronic apparatus received from the electronic apparatus or the recording medium connected to the first connection terminal to a high order monitoring apparatus through the wide area network.

According to an additional aspect of the present invention, there is provided a notification method of apparatus management information by a low order monitoring apparatus for notifying a high order monitoring apparatus of apparatus management information of any of a plurality of electronic apparatus each used in a non-connected state to a wide area network and controlled by the low order monitoring apparatus, including a step of issuing a request for apparatus management information to a particular one of the electronic apparatus which makes an object of monitoring or a recording medium removed from the particular electronic apparatus, and a step of retaining the apparatus management information acquired from the particular electronic apparatus or the recording medium into a storage apparatus.

According to another additional aspect of the present invention, there is provided a program for causing a computer, which is incorporated in a low order monitoring apparatus for notifying a high order monitoring apparatus acquired of apparatus management information from any of a plurality of electronic apparatus each used in a non-connected state to a wide area network and controlled by the low order monitoring apparatus through the wide area, to execute a function of causing a request for apparatus management information to be issued to a particular one of the electronic apparatus which makes an object of monitoring or a recording medium removed from the particular electronic apparatus, and a function of causing the apparatus management information acquired from the particular electronic apparatus or the recording medium to be retained into a storage apparatus.

According to a further additional aspect of the present invention, there is provided a recording medium on which a program is recorded for causing a computer, which is incorporated in a low order monitoring apparatus for notifying a high order monitoring apparatus of apparatus management information acquired from any of a plurality of electronic apparatus each used in a non-connected state to a wide area network and controlled by the low order monitoring apparatus, to execute a function of causing a request for apparatus management information to be issued to a particular one of the electronic apparatus which makes an object of monitoring or a recording medium removed from the particular electronic apparatus, and a function of causing the apparatus management information acquired from the particular electronic apparatus or the recording medium to be retained into a storage apparatus.

According to a still further additional aspect of the present invention, there is provided a high order monitoring apparatus for a remote monitoring system for indirectly monitoring a plurality of electronic apparatus each used in a non-connected state to a wide area network through one of a plurality of low order monitoring apparatus connected to the high order monitoring apparatus through the wide area network, including an information collection section for issuing a request for transmission of apparatus management information acquired by the low order monitoring apparatus to the low order monitoring apparatus, and a storage apparatus for unitarily retaining the apparatus management information of the electronic apparatus included in the remote monitoring system.

According to a yet further additional aspect of the present invention, there is provided a communication method of maintenance data by a high order monitoring apparatus which indirectly monitors a plurality of electronic apparatus each used in a non-connected state to a wide area network through one of a plurality of low order monitoring apparatus connected to the high order monitoring apparatus through the wide area network, including a step of reading out, upon transmission of maintenance data to a particular one of the electronic apparatus, a wide area network address of one of the low order monitoring apparatus, which has the particular electronic apparatus placed under the direct monitoring thereof, from a storage apparatus, and a step of transmitting the maintenance data destined for the particular electronic apparatus to the wide area network address read out from the storage apparatus.

According to a yet further additional aspect of the present invention, there is provided a program for causing a computer incorporated in a high order monitoring apparatus, which indirectly monitors a plurality of electronic apparatus each used in a non-connected state to a wide area network through one of a plurality of low order monitoring apparatus connected to the high order monitoring apparatus through the wide area network, to execute a function of causing, upon transmission of maintenance data to a particular one of the electronic apparatus, a wide area network address of one of the low order monitoring apparatus, which has the particular electronic apparatus placed under the direct monitoring thereof, to be read out from a storage apparatus, and a function of causing the maintenance data destined for the particular electronic apparatus to be transmitted to the wide area network address read out from the storage apparatus.

According to a yet further additional aspect of the present invention, there is provided a recording medium on which a program is recorded for causing a computer incorporated in a high order monitoring apparatus, which indirectly monitors a plurality of electronic apparatus each used in a non-connected state to a wide area network through one of a plurality of low order monitoring apparatus connected to the high order monitoring apparatus through the wide area network, to execute a function of causing, upon transmission of maintenance data to a particular one of the electronic apparatus, a wide area network address of one of the low order monitoring apparatus, which has the particular electronic apparatus placed under the direct monitoring thereof, to be read out from a storage apparatus, and a function of causing the maintenance data destined for the particular electronic apparatus to be transmitted to the wide area network address read out from the storage apparatus.

With the remote monitoring system, remote monitoring method, low order monitoring apparatus, notification method, high order monitoring apparatus, communication method of maintenance data, program and recording medium, the electronic apparatus which are used in a state disconnected from the wide area network can be monitored from a remote place. Therefore, even if some fault occurs with any of the electronic apparatus after the electronic apparatus is carried to a site, a cause of the fault of the electronic apparatus can be specified from the remote plate.

Further, it is possible to correct apparatus management information or firmware of the electronic apparatus from the remote place to recover the function of the electronic apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 7 is a view illustrating the substance of processes executed by a low order monitoring apparatus;

FIG. 10 is a table illustrating an example of apparatus management information;

FIG. 11 is a table illustrating an example of directory data coordinated with IP addresses and port numbers;

DETAILED DESCRIPTION OF THE PREFERRED EMBODIMENTS

1. Remote Monitoring System

Figure 1:
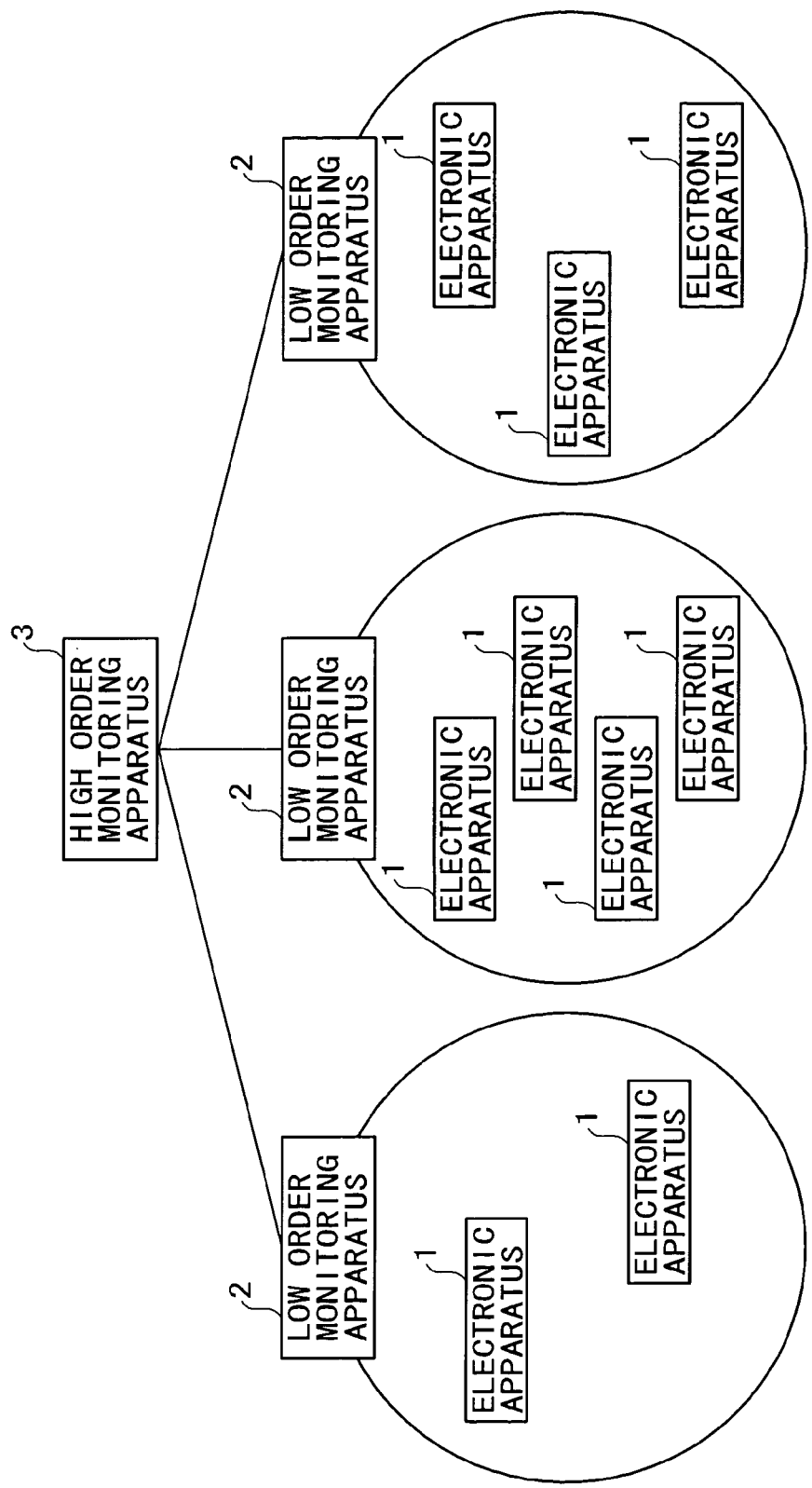
FIG. 1 is a block diagram showing a basic configuration of a remote management system.

FIG. 1 shows a remote monitoring system to which the present invention is applied. The remote monitoring system includes a plurality of electronic apparatus 1 each of which makes an object of monitoring, one or more low order monitoring apparatus 2 for directly monitoring the electronic apparatus 1, and a high order monitoring apparatus 3 for indirectly monitoring the electronic apparatus 1 through the low order monitoring apparatus 2.

The remote monitoring system implements two functions including an apparatus management information collection function and a maintenance data transmission function.

In the following, the components of the remote monitoring system are described in connection with the functions.

1-1. Apparatus Management Information Collection Function a. Electronic Apparatus Each of the electronic apparatus 1 is used in a state wherein it is not connected to a wide area network. It is to be noted that the electronic apparatus 1 retains apparatus management information relating to operation of the apparatus. Part of the apparatus management information can be rewritten. Preferably, firmware of the electronic apparatus 1 can be rewritten.

The electronic apparatus 1 is used in a state wherein it is not connected to any low order monitoring apparatus 2. That the electronic apparatus 1 is not connected to any low order monitoring apparatus 2 signifies that the electronic apparatus 1 is usually in a non-connected state but does not signify that it cannot be used in a state wherein it is connected to the low order monitoring apparatus 2. Further, the electronic apparatus 1 preferably is a portable apparatus. Here, that the electronic apparatus 1 is a portable apparatus signifies that the electronic apparatus 1 can be carried by a person and besides can be placed on and transported by a vehicle, a ship, an aircraft or the like.

One of such electronic apparatus 1 is, for example, a broadcasting apparatus. Since a portable broadcasting apparatus is used at a site inside and outside the country, it satisfies the condition described above. Further, the electronic apparatus 1 preferably incorporates a communication function with a local area network. The connection to the local area network in this instance may be any of a wire connection and a wireless connection.

For the connection to the local area network, typically the IP (Internet Protocol) connection is used. Further, for the connection to the local area network, for example, the Ethernet (registered trademark), a serial communication system (for example, RS232C), or a serial bus (for example, IEEE1394, USB (Universal Serial Bus)) is used.

The electronic apparatus 1 may be of the type which can be connected to the low order monitoring apparatus 2 using a removable recording medium such as, a semiconductor memory, a magnetic recording medium or an optical recording medium. As the magnetic recording medium, for example, a magnetic disk such as, for example, a flexible disk or a hard disk, or a magnetic tape can be used. Further, as the optical recording medium, an optical recording medium of the type on which data are written optically and from which the data are read out magnetically can be used. Further, as the optical recording medium, an optical recording medium, for example, of the type on and from which data are written and read out optically can be used.

b. Low Order Monitoring Apparatus

The low order monitoring apparatus 2 is a network terminal which can communicate with the wide area network. Preferably, the low order monitoring apparatus 2 is normally connected to the wide area network. In this instance, a wide area network address of the low order monitoring apparatus 2 is decided fixedly. The low order monitoring apparatus 2 manages a coordination table which coordinates the address and the electronic apparatus 1 with each other. The low order monitoring apparatus 2 can use the coordination table to artificially handle the electronic apparatus 1 as devices on the wide area network.

It is to be noted that only it is necessary for the low order monitoring apparatus 2 to be connected to the wide area network as occasion demands. In this instance, the wide area network address of the low order monitoring apparatus 2 is decided dynamically for every connection. However, also in this instance, the low order monitoring apparatus 2 can actually manage the wide area network address similarly to the fixed address if a notification of a change of the address is issued to the high order monitoring apparatus 3. Also in this instance, the low order monitoring apparatus 2 manages the coordination table wherein the address and the electronic apparatus 1 are coordinated with each other.

The low order monitoring apparatus 2 has a function of acquiring apparatus management information from a particular electronic apparatus 1 of an object of monitoring when the electronic apparatus 1 is connected or when a recording medium removed from the electronic apparatus 1 is connected. The apparatus management information includes, for example, operation logs. The operation logs include, for example, an operation history in the past and an operation log of the apparatus. The management of the operation logs facilitates specification of a cause of a fault in operation.

The apparatus management information further includes, for example, dynamic setting information. The dynamic setting information is information which varies dynamically in response to an operation of a user or an operation condition of the apparatus. The dynamic setting information includes, for example, the remaining capacity of a battery, the contrast of a viewfinder, and the white balance of a camera lens. Management of the dynamic setting information allows confirmation of whether or not the setting conditions at present are suitable for a situation of use.

The apparatus management information further includes, for example, static setting information. The static setting information is static information unique to each apparatus. In other words, the static setting information signifies information which dos not vary irrespective of an operation of a user or an operation condition of the apparatus. The static setting information includes, for example, the name of a model of the apparatus, the version number of firmware, and the name of a model of a battery. Management of the static setting information allows provision of a version up service of the firmware.

The apparatus management information further includes, for example, a result of a diagnosis executed by a self-diagnosis program in the electronic apparatus 1. The self-diagnosis program may be executed automatically by the electronic apparatus 1. Or, the self-diagnosis program may be called and executed by the low order monitoring apparatus 2.

It is to be noted that the low order monitoring apparatus 2 has also a function of notifying the high order monitoring apparatus 3 of apparatus management information acquired thereby through the wide area network. The communication here is implemented, for example, by an IP (Internet Protocol) connection technique or a PPP (Point to Point Protocol) connection technique.

Incidentally, the low order monitoring apparatus 2 in the remote monitoring system cannot always be connected to the wide area network because of the environment of use thereof. Therefore, the low order monitoring apparatus 2 preferably incorporates a buffer function in preparation for such a possible case.

In particular, the low order monitoring apparatus 2 preferably includes a transmission buffer for retaining, when a particular electronic apparatus 1 which makes an object of monitoring of the low order monitoring apparatus 2 is connected to the low order monitoring apparatus 2 or when a recording medium removed from the electronic apparatus 1 is connected to the low order monitoring apparatus 2, apparatus management information acquired from the electronic apparatus 1 until after communication of the low order monitoring apparatus 2 with the wide area network is enabled.

The low order monitoring apparatus 2 may periodically transmit apparatus management information acquired from the electronic apparatus 1 to the high order monitoring apparatus 3. Or, the low order monitoring apparatus 2 may transmit apparatus management information acquired from the electronic apparatus 1 to the high order monitoring apparatus 3 in accordance with a request received from the high order monitoring apparatus 3. Further, the low order monitoring apparatus 2 preferably has a function of voluntarily notify the high order monitoring apparatus 3 when the low order monitoring apparatus 2 finds out an abnormal state of an electronic apparatus 1 from apparatus management information acquired thereby. This function can prevent occurrence of a fault. Further, the function makes it possible to rapidly cope with occurrence of a fault.

It is to be noted that the low order monitoring apparatus 2 preferably incorporates a function of absorbing a difference in expression in response to a type or a model of an electronic apparatus of an object of monitoring. In other words, the low order monitoring apparatus 2 preferably incorporates a function which can convert acquired apparatus management information into information of a unitary data structure. This function can achieve efficient monitoring also where a large number of electronic apparatus are monitored.

It is to be noted that the low order monitoring apparatus 2 can preferably interpret a destination of reception data and reread a communication port in response to whether the destination is the low order monitoring apparatus 2 itself or the high order monitoring apparatus 3. The incorporation of the function can achieve direct communication of an electronic apparatus 1 which is an object of monitoring of the low order monitoring apparatus 2 to the high order monitoring apparatus 3.

It is to be noted that the low order monitoring apparatus 2 preferably has directory information describing, which one of apparatus management information of each of the electronic apparatus 1 should be repeated to which one of the high order monitoring apparatus 3. The incorporation of the function can achieve communication with an appropriate high order monitoring apparatus even where a plurality of the high order monitoring apparatuse 3 are involved.

c. High Order Monitoring Apparatus

The high order monitoring apparatus 3 is a network terminal which can communicate with the wide area network. Preferably, the high order monitoring apparatus 3 is normally kept in connection to the wide area network. The high order monitoring apparatus 3 has a function of unitarily managing apparatus management information of the electronic apparatus 1 acquired through the low order monitoring apparatus 2.

Further, the high order monitoring apparatus 3 preferably incorporates a function of absorbing a difference in expression in response to a type or a model of an electronic apparatus of an object of monitoring. Even where the function is incorporated in the high order monitoring apparatus 3, a large number of electronic apparatus can be monitored efficiently similarly as in the case wherein an equivalent function is incorporated in the low order monitoring apparatus 2. It is to be noted that the communication of the high order monitoring apparatus 3 with the low order monitoring apparatus 2 may be performed through any of a wire connection and a wireless connection.

Furthermore, the high order monitoring apparatus 3 preferably includes a coordination table which coordinates electronic apparatus recognized as an object of monitoring and connection confirmation information of them with each other. Where this function is incorporated, a connection situation between the electronic apparatus 1 and the low order monitoring apparatus 2 can be confirmed by the high order monitoring apparatus 3 while the high order monitoring apparatus 3 is located at a remote place.

1-2. Maintenance Data Transmission Function a. High Order Monitoring Apparatus

The high order monitoring apparatus 3 prepares maintenance data unique to a particular electronic apparatus 1 which makes an object of monitoring. The maintenance data are a firmware program and a correction program. The correction program is a system file of an application or an execution file for partly correcting the firmware. The correction program includes correction patch and up programs.

The high order monitoring apparatus 3 transmits such maintenance data to a low order monitoring apparatus 2 through the wide area network. The low order monitoring apparatus 2 places the electronic apparatus 1, which is a transmission destination of the maintenance data, under the direct monitoring thereof. It is to be noted that, in order for the high order monitoring apparatus 3 to transmit the maintenance data to the particular electronic apparatus 1, the high order monitoring apparatus 3 preferably retains information of by which one of the low order monitoring apparatus 2 the particular electronic apparatus 1 is being monitored at present.

To this end, the high order monitoring apparatus 3 retains, for example, a coordination table which coordinates the electronic apparatus 1 of an object of monitoring and the wide area network address of the low order monitoring apparatus 2 which monitor the electronic apparatus 1. The electronic apparatus 1 which are objects of monitoring of the high order monitoring apparatus 3 do not exist on the wide area network. Therefore, each of the high order monitoring apparatus 3 transmits maintenance data to a particular low order monitoring apparatus 2 positioned on the wide area network.

b. Low Order Monitoring Apparatus

Each of the low order monitoring apparatus 2 has a function of rewriting apparatus management information of a particular electronic apparatus which is an object of monitoring thereof. For example, the low order monitoring apparatus 2 can change an error of dynamic setting information to correct information. The low order monitoring apparatus 2 uses the rewriting function to write maintenance data received from the high order monitoring apparatus 3 into the electronic apparatus 1.

It is to be noted that, where an electronic apparatus 1 which is an object of monitoring of the low order monitoring apparatus 2 is used in a state wherein it is not connected to the low order monitoring apparatus 2, the low order monitoring apparatus 2 cannot write the maintenance data into the electronic apparatus 1.

Therefore, the low order monitoring apparatus 2 preferably has a reception buffer for retaining maintenance data until after the electronic apparatus 1 is connected or until after a recording medium removed from the electronic apparatus 1 is connected. The low order monitoring apparatus 2 writes maintenance data retained therein into the electronic apparatus 1 after it confirms the connection of the electronic apparatus 1.

Further, the low order monitoring apparatus 2 preferably interprets the destination of reception data and rereads a communication port depending upon whether the destination is the low order monitoring apparatus 2 itself or an electronic apparatus 1. The incorporation of the function can achieve implementation of direct communication from the high order monitoring apparatus 3 to an electronic apparatus 1 which is an object of monitoring.

In the following, preferred embodiments of the present invention are described. It is to be noted that, for those matters which are not particularly illustrated in the drawings or described in the specification, known techniques in the pertaining technical field are selectively applied. Further, the present invention can be carried out by hardware having functions equivalent to those of software described below.

1. Business Model

The remote monitoring system proposed herein can be used, for example, by an owner or an occupant of monitoring object apparatus to grasp an operation situation of the assets on hand.

1-1. Application 1

Figure 2:
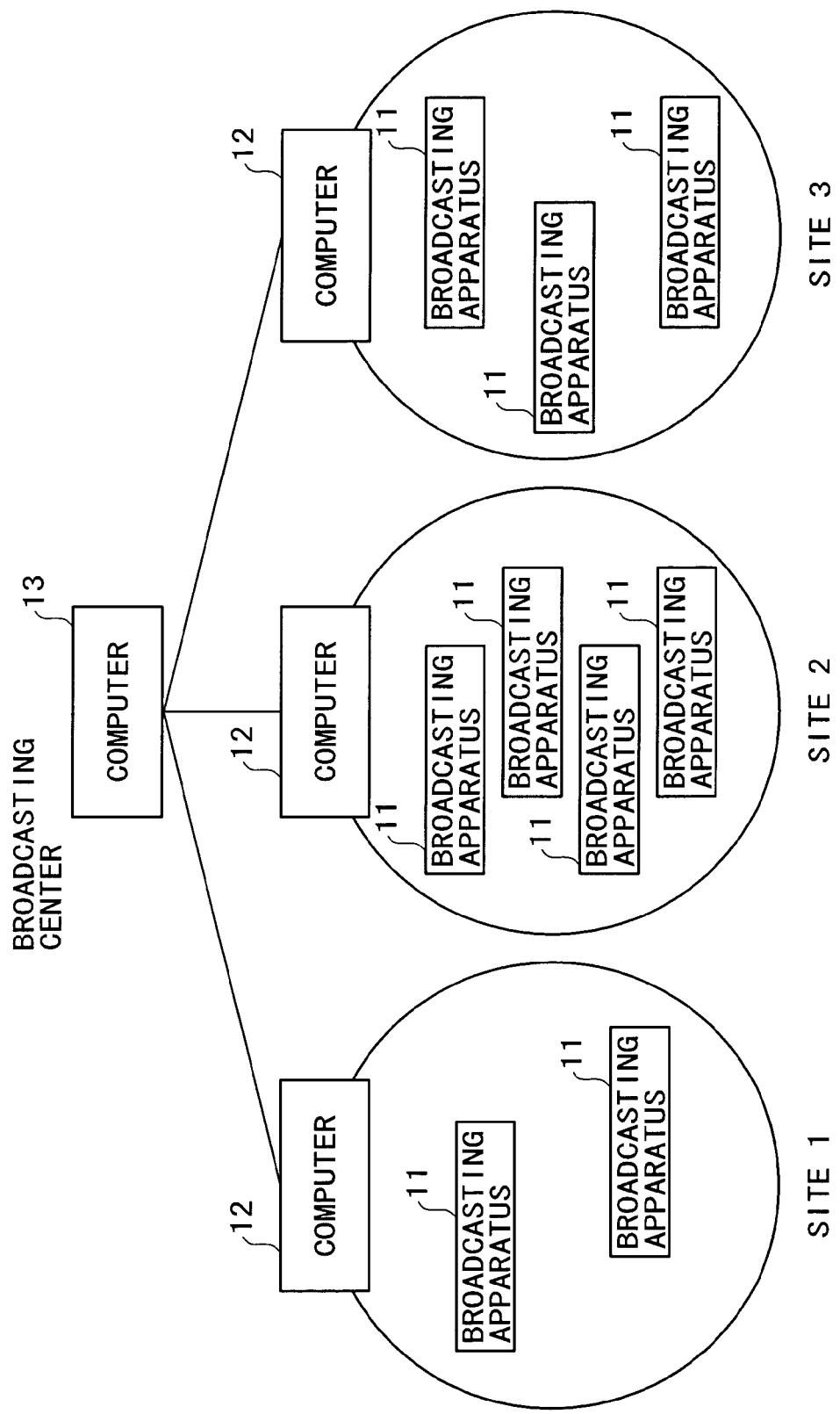
FIG. 2 is a similar view but showing an example of an application of the remote management system to a broadcasting system.

FIG. 2 shows an application which is an example of a system suitably applied where a broadcasting undertaker remotely monitors broadcasting apparatus 11. Referring to FIG. 2, a computer 12 shown is of the notebook type which is carried to a site together with a broadcasting apparatus 11. Another computer 13 is of the stationary type installed on the broadcasting center side.

Each of the broadcasting apparatus 11 is used in a physically sole or discrete condition or in a condition close to such condition. In other words, the broadcasting apparatus 11 is used in a state wherein it is not connected to any computer 12. The broadcasting apparatus 11 of the type described may be, for example, a portable recorder or editing machine integrated with a camera. However, the broadcasting apparatus 11 may otherwise be a broadcasting apparatus installed in a building. The system configuration shown in FIG. 2 can be applied also to a broadcasting apparatus installed in a building.

The business model supposes monitoring of a broadcasting apparatus used at a site of material collection. One of reasons resides in recent digitalization of broadcasting apparatus. With a digital apparatus, it is difficult to distinguish a trouble arising from an error in setting or a misapprehension of a method of use and a physical failure which really requires repair from each other only from the condition.

Therefore, even when a trouble occurs, it is difficult for a user at a site of material collection by itself to solve the problem. Besides, the site of material collection may not be in the proximity of the broadcasting center. Or, the site of material collection may be a region inside or outside the country where no maintenance staff may be available in the neighborhood.

At present, one of a method of enhancing the technical skill of the user and another method of sending a technical specialist together with the user is used.

However, in order to enhance the technical skill of the user, training for a fixed period of time and the cost are required. Further, a monetary loss arises from the fact that the broadcasting apparatus and the user cannot be used for their original objects during the period of the training. On the other hand, also where a technical specialist is sent together with the user, additional expenditure of an expense for the accompanying technical specialist is required. This is not preferable from the point of view of administration.

In addition, the speed of the technical innovation in recent years has been and is very high, and a progressively enhanced technical skill is required for handling of broadcasting apparatus. This situation signifies that, in order to adopt a new technique, not only investment to machines and materials but also increase of the personnel expenditure are required. This is a restrictive condition to introduction of new techniques.

Accordingly, the remote monitoring system shown in FIG. 2 is very effective to stably use broadcasting apparatus, which are used at a site of material collection, at a low cost. Where the system is adopted, a trouble arising from an error in setting of a broadcasting apparatus or a misapprehension of a method of use can be solved remotely. Further, a physical failure situation which actually requires repair can be grasped by the broadcasting center.

In addition, also different effects can be anticipated through the adoption of the system described above. Digital apparatus in recent years have a built-in CPU (Central Processing Unit) and are program-controlled almost without any exception. Accordingly, if the system is utilized to download firmware periodically or as occasion demands, then the performance of the broadcasting apparatus 11 can be updated normally to an up-to-date state.

Particularly, in a broadcasting station wherein a large number of broadcasting apparatus are used and monitored, version-up management of the firmware is significant. However, use of the remote monitoring system makes it possible to perform updating of the firmware with certainty at an opportunity at which a broadcasting apparatus 11 is connected to the computer 12. This raises also the reliability of the system.

The remote monitoring system can be used also for provision of technical information such as FAQ (Frequently Asked Questions) or an up-to-date manual for prevention of a trouble. Contents which can be provided are equivalent to those which can be acquired using a telephone system. However, there is a significant difference in terms of the reproducibility between taking a memo while listening and a situation wherein contents can be confirmed on the screen of the computer 12.

The remote monitoring system is effective also for the broadcasting center side to know a detailed operation situation of the machines and materials. At present, for example, a situation of machines and materials which are used in a small-scale branch station or a situation of machines and materials used outdoors can be grasped only from a report prepared once per half term by a user.

However, where the remote monitoring system is used, a detailed use state of also portable broadcasting apparatus and broadcasting apparatus carried on repeating cars can be grasped in a high frequency.

As a result, it is possible to grasp an actual availability of a broadcasting apparatus of an object of monitoring, whether or not inspection or maintenance is required, analogy of whether machines and materials are sufficient or insufficient and other operation situations of assets. Further, since a detailed use situation unique to each apparatus can be grasped, scheduled carrying out of inspection and maintenance is possible. The scheduled carrying out is effective also to eliminate unnecessary periodical inspection. Further, different from simultaneous inspection, the scheduled carrying out is effective also to facilitate skillful management of broadcasting apparatus during inspection.

The scheduled carrying out of inspection and maintenance is advantageous also to the maker and the vendor. Since the period of inspection and maintenance can be dispersed, the scheduled carrying out is effective also to compress the personnel and the inventory of parts. In this manner, various effects can be anticipated with the application.

1-2. Application 2

Figure 3:
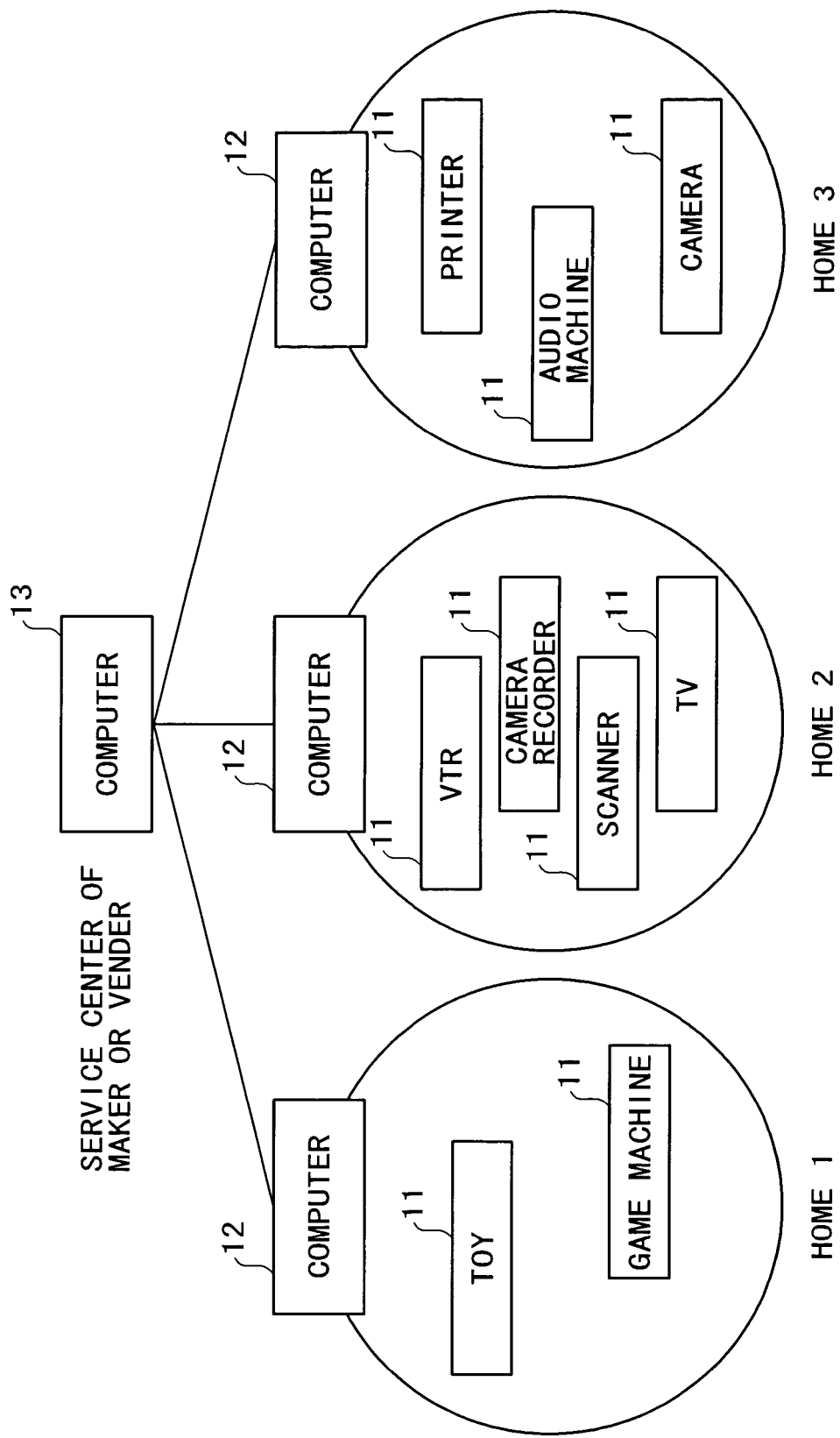
FIG. 3 is a similar view but showing an example of an application of the remote management system to a support system.

FIG. 3 shows another application which is an example of a system suitable where a maker or a vendor of an electronic apparatus remotely monitors an electronic apparatus of a user. The application can be applied to electronic apparatus 11 such as, program-controlled game machines and other toys, video recorders, digital cameras, recorders integrated with a camera, scanners and printers. Each of the electronic apparatus 11 allows removal of a recording medium therefrom or includes some communication terminals with the outside.

When some fault occurs with such an apparatus as mentioned above, conventionally it is necessary to carry the apparatus to a support center of the maker or the vendor or to cause support staff to go to the site of use.

However, where the remote monitoring system is used, only it is necessary to connect the electronic apparatus 11 to the computer 12 or connect a recording medium removed from the broadcasting apparatus 11 to the computer 12.

Thereafter, apparatus management information of the broadcasting apparatus 11 is acquired through the computer 12 and connected to the computer 13 on the support center side through the wide area network. As a result, a trouble arising from an error in setting of the apparatus or a misapprehension of the method of use can be solved remotely. Further, a physical failure situation which actually requires repair and a cause of the failure can be grasped by the support center side in advance.

Further, for a program-controlled apparatus, the remote monitoring system can be utilized for version-up of firmware. Thus, addition or improvement of a function of the electronic apparatus can be achieved. In this manner, the remote monitoring system can be applied widely to electronic apparatus which are not connected to the wide area network during normal use thereof.

2. Hardware Configuration

Now, a hardware configuration of the electronic apparatus and the monitoring apparatus which form the remote monitoring system is described.

2-1. Electronic Apparatus

Figure 4:
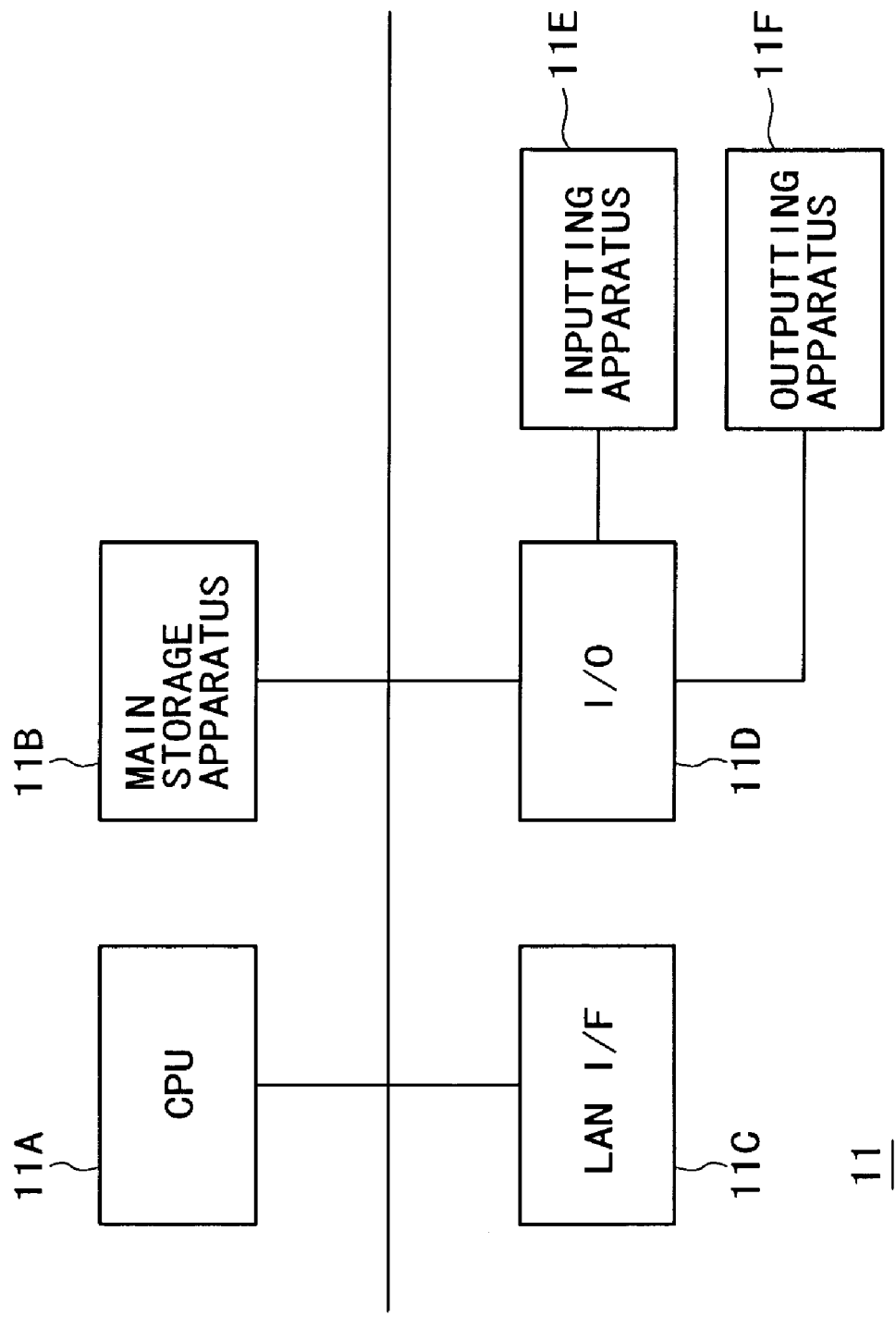
FIG. 4 is a block diagram showing a hardware configuration of an electronic apparatus.

FIG. 4 shows a hardware configuration of the broadcasting apparatus 11. In the following, a hardware configuration of the electronic apparatus 11 where the electronic apparatus 11 has a basic configuration as a computer is described. It is to be noted that equivalent functions can be implemented not by control by software but by hardware.

The electronic apparatus 11 includes a CPU 11A, a main storage apparatus 11B, a LAN (Local Area Network) interface 11C, an input/output interface 11D, an inputting apparatus 11E, and an outputting apparatus 11F.

The CPU 11A executes firmware to implement functions unique to the electronic apparatus 11. The main storage apparatus 11B includes a ROM (Read Only Memory) for storing a basic input/output program and a RAM (Random Access Memory) for storing the firmware. Software is executed using the RAM as a working area.

For example, an Ethernet (registered trademark) port is used for the LAN interface 11C. The electronic apparatus 11 performs TCP (Transmission Control Protocol)/IP (Internet Protocol) communication with the computer 12 through the LAN interface 11C.

The input/output interface 11D provides an operation input of the inputting apparatus 11E to the CPU 11A through a bus.

Further, the input/output interface 11D outputs a control output of the CPU 11A inputted through the bus to the outputting apparatus 11F.

The inputting apparatus 11E is formed from an inputting apparatus suitable for the electronic apparatus 11. For example, a rotary type operation element, a slide type operation element, a pushbutton type operation element, a dip switch and so forth are used for the inputting apparatus 11E. The outputting apparatus 11F is formed from an outputting apparatus suitable for the electronic apparatus 11. For example, a control circuit for each mechanical part is used. Further, indication or display apparatus such as, a display unit and an indicator are used.

2-2. Computer

Figure 5:
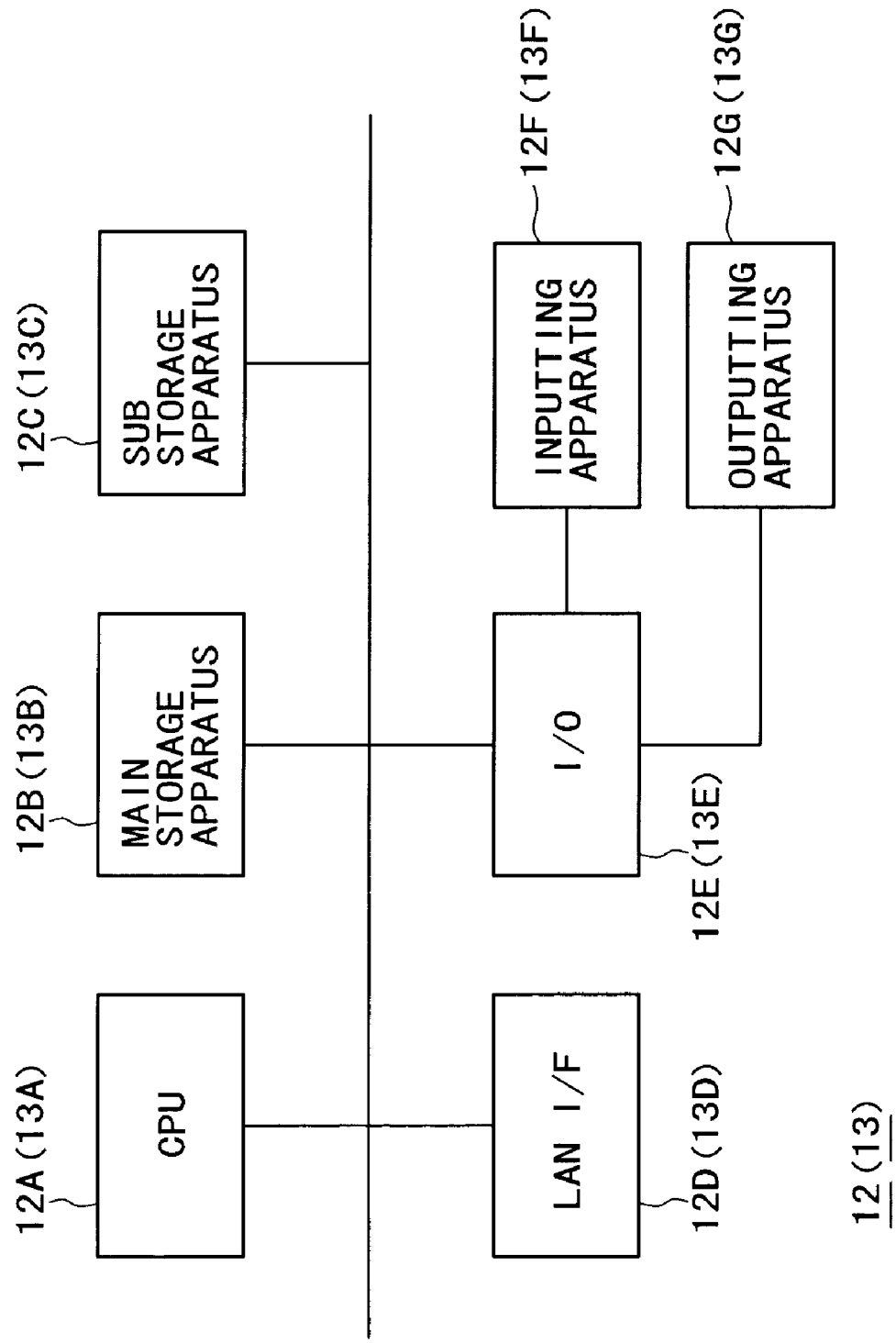
FIG. 5 is a block diagram showing a hardware configuration of a computer.

The computers 12 and 13 have a basically same hardware configuration. FIG. 5 shows a hardware configuration of the computer 12. It is to be noted that also the computer 13 has the same configuration as that shown in FIG. 5.

The computer 12 includes a CPU 12A, a main storage apparatus 12B, a sub storage apparatus 12C, a LAN (Local Area Network) interface 12D, an input/output interface 12E, an inputting apparatus 12F, and an outputting apparatus 12G.

Since the basic configuration of the computer 12 is same as that of the electronic apparatus 11, only differences are described. For the sub storage apparatus 12C, for example, a hard disk apparatus or a drive apparatus for an optical recording medium is used. For the inputting apparatus 12F, a keyboard and a mouse or some other pointing device are used. For the outputting apparatus 12G, a display unit and other peripheral apparatus are used.

3. Software Configuration

Now, a software configuration of the electronic apparatus and the computers which form the remote monitoring system is described.

3-1. Electronic Apparatus

Figure 6:
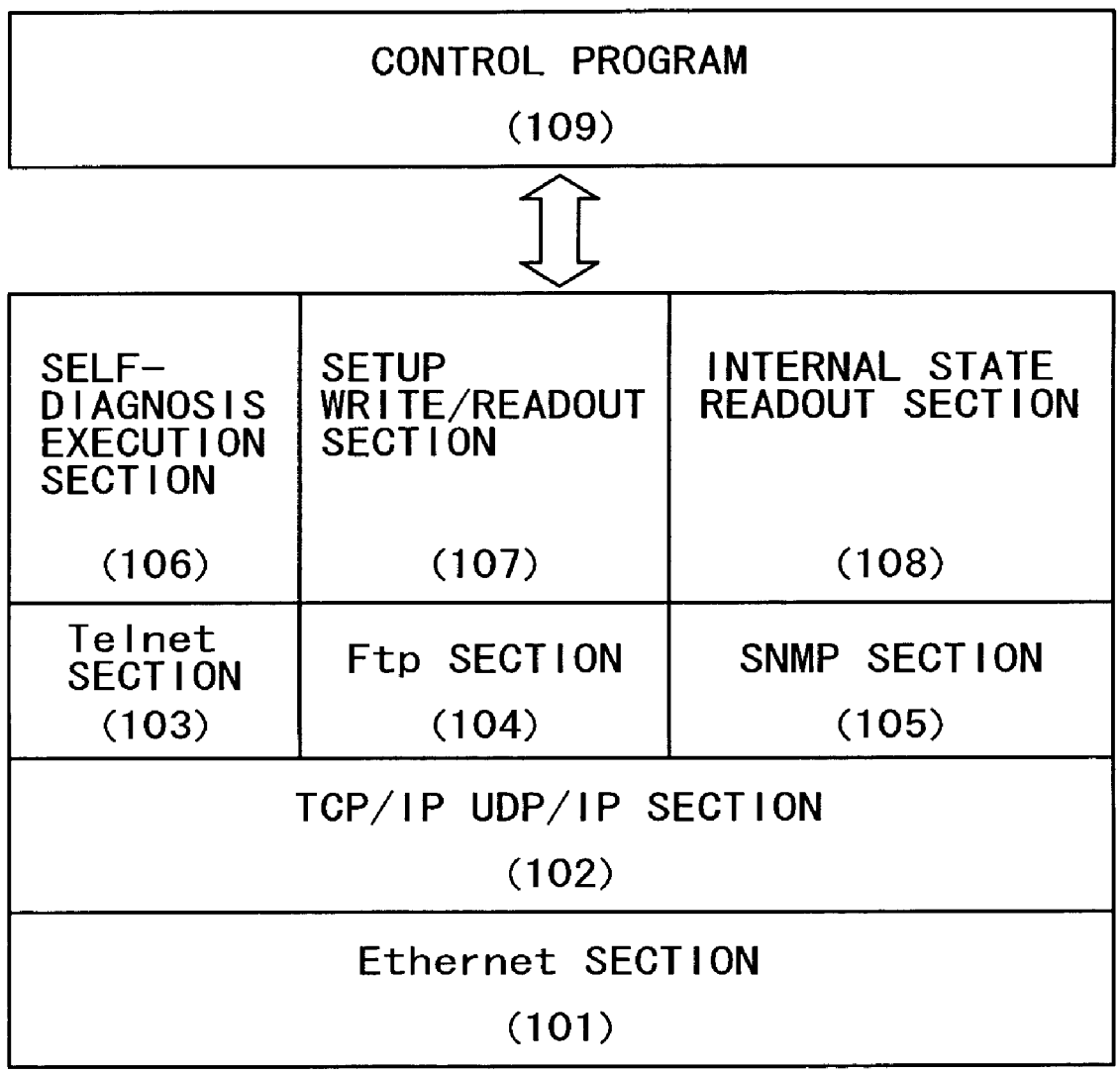
FIG. 6 is a view illustrating the substance of processes executed by the electronic apparatus.

FIG. 6 shows a software configuration of the electronic apparatus 11.

An Ethernet section 101 is software for implementing transmission and reception of an Ethernet frame. A TCP/IP UDP (User Datagram Protocol)/IP section 102 is software for implementing a process (application) on the computer 12 and session-oriented and datagram-oriented communication.

A telnet section 103 is software for making possible remote operation from the computer 12 connected thereto from a TCP/IP network. In the remote monitoring system, each electronic apparatus 11 functions as a Telnet server.

An ftp section 104 is software for making possible file transfer to and from a computer 12 connected thereto through the ICP/IP network. In the remote monitoring system, each electronic apparatus 11 functions as an ftp server.

An SNMP (Simple Network Management Protocol) section 105 is software for making possible monitoring by a computer 12 connected thereto through a UDP/IP network. In the remote monitoring system, each electronic apparatus 11 functions as an SNMP agent.

A self-diagnosis execution section 106 is software for executing reading out and storage of an internal situation at present. A setup write/readout section 107 is software for executing reading out of setting information at present or writing of setting information. An internal state readout section 108 is software used to read out a log of an internal configuration or a log of an operation situation. A control program 109 operates as a higher layer of the software described above, and operates in accordance with a received command through a lower layer.

3-2. Computer (Low Order Monitoring Apparatus)

FIG. 7 illustrates a software configuration of the computer 12 which functions as a low order monitoring apparatus.

The software of the computer 12 has a two-stage configuration including software elements 201 to 209 for implementing communication with an electronic apparatus 11 as a monitoring object apparatus, and software elements 209 to 215 for implementing communication with a computer 13 which is a high order monitoring apparatus.

The Ethernet section 201 and the TCP/IP UDP/IP section 202 have a software configuration same as that of the electronic apparatus 11, and therefore, description of the configuration is omitted herein to avoid redundancy.

The telnet section 203 is software for remotely operating the electronic apparatus 11. In the remote monitoring system, the computer 12 functions as a Telnet client.

The ftp section 204 is software for making possible file transfer to and from the electronic apparatus 11 connected thereto through the TCP/IP network. In the remote monitoring system, the computer 12 functions as an ftp client.

The SNMP section 205 is software for making possible monitoring of the electronic apparatus 11 connected thereto through the UDP/IP network. In the remote monitoring system, the computer 12 functions as an SNMP manager.

The self-diagnosis requesting section 206 is software for requesting the electronic apparatus 11 to execute a self-diagnosis program. The setup write/readout requesting section 207 is software for requesting the electronic apparatus 11 to perform reading out and writing of setting information. The internal state readout requesting section 208 is software for requesting the electronic apparatus 11 to read out a log of an internal operation or a log of an operation situation.

The control program 209 is software which operates as a higher layer of the software described above. The control program 209 sends a command to the electronic apparatus 11. Further, the control program 209 controls storage and reading out of internal state data or log data received through the lower layer. It is to be noted that the computer 12 has a database for storing such internal state data or log data as mentioned above. The database is implemented using an area of the sub storage apparatus 12C.

Further, the control program 209 executes a communication function with the computer 13 which is a high order monitoring apparatus. The control program 209 interprets reception data from the electronic apparatus 11 and executes rereading of a communication port in response to a destination of the reception data. For example, if the reception data is destined for the computer 13, then the communication port is changed over to a data repeating section 300.

Further, the control program 209 accesses the database to determine a transmission destination of reception data in response to a transmission source. The directory information in this instance is stored in the sub storage apparatus 12C.

The information formulating section 210 is software for absorbing a difference in representation form of internal state data or log data. In other words, the information formulating section 210 formulates data into data of a unitary data structure and transmits the data of the unitary data structure to the computer 13.

The information variation detection section 211 is software for detecting whether or not acquired internal state data have a change determined in advance. For example, the information variation detection section 211 detects, for example, whether or not a cumulative period of time is equal to or longer than a fixed period of time. Using the detection as a trigger, the computer 12 transmits internal state data to the high order monitoring apparatus.

The information request reception section 212 is software for receiving a requesting command from the high order monitoring apparatus. Upon reception of the requesting command, the information request reception section 212 reads out internal state data retained in the database and transmits the internal state data to the high order monitoring apparatus.

The protocol stack 213 is a software set including protocols which are required to implement certain functions on the network and are layered. The software set includes, for example, SNMP software, ftp software and http (Hypertext Transfer Protocol) software.

The TCP/IP UDP/IP section 214 and the Ethernet section 215 have a software configuration same as that of the electronic apparatus 11.

It is to be noted that the computer 12 additionally has a data repeating section 300. The data repeating section 300 is software for repeating communication between the electronic apparatus 11 and the computer 13 which is the high order monitoring apparatus of the electronic apparatus 11.

Figure 8:
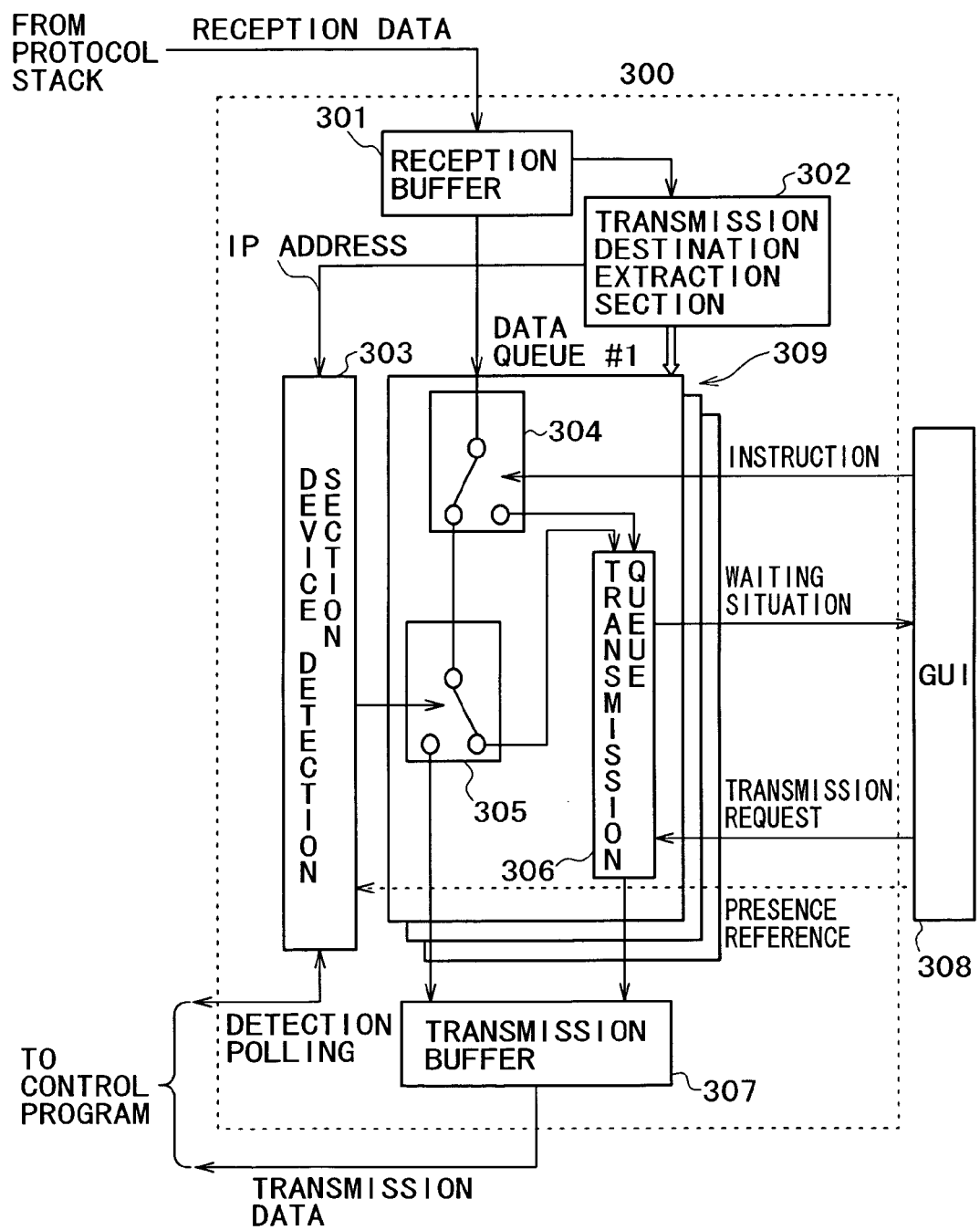
FIG. 8 is a block diagram illustrating the substance of processes executed by a data repeating section.

FIG. 8 shows a structure of a processing program executed by the data repeating section 300. FIG. 8 corresponds to the functional section which repeats communication from the high order monitoring apparatus to an electronic apparatus 11. It is to be noted that also the functional section for repeating communication from the electronic apparatus 11 to the high order monitoring section has a basic structure similar to that shown in FIG. 8.

The difference is that, in communication to the high order monitoring apparatus, reception data are given from the control program 209 and transmission data are outputted to the protocol stack 213. Incidentally, the data repeating section 300 can be implemented as hardware. For example, the data repeating section 300 can be implemented as a board type device or a card type device.

The data repeating section 300 executes a reception process of reception data at a reception buffer section 301 thereof. The reception buffer section 301 provides the reception data to a transmission destination extraction section 302. The transmission destination extraction section 302 extracts an IP address part of the reception data. The transmission destination extraction section 302 selects a queue bank based on the extracted IP address. Further, the transmission destination extraction section 302 provides the extracted IP address to a device detection section 303.

The device detection section 303 detects whether or not a transmission destination designated by the IP address is in a communicatable state. This detection process is implemented through communication with the control program 209. It is to be noted that a result of the detection is used for changeover of a switch 305.

Switches 304 and 305 and a transmission queue 306 are provided for each of data queues which form queue banks 309. The switch 304 is used to change over a repeating path of the reception data in accordance with an instruction from a GUI (Graphical User Interface) 308. For example, when immediate transfer of the reception data is required, the switch 304 outputs the reception data to the switch 305 at the next stage. On the other hand, for example, if it is required to hold the reception data once and transfer the reception data newly at a timing indicated by the user, then the switch 304 outputs the reception data to a transmission queue 306.

The switch 305 is used to change over the repeating path depending upon whether or not communication with the device of the transmission destination is possible. For example, when the device of the transmission destination is detected, the switch 305 outputs the reception data to a transmission buffer 307. On the other hand, for example, if the device of the transmission destination is not detected, then the switch 305 outputs the reception data to a transmission queue 306.

The transmission queue 306 retains the reception data until after a request for transmission of the reception data is received from the GUI 308. The transmission buffer 307 executes a transmission process of the reception data inputted thereto from the switch 305 or the transmission queue 306. The GUI 308 provides principally four functions. One of the functions is to confirm the presence of the transmission destination from the device detection section 303. Another one of the functions is to issue an instruction of a repeating form to the switch 304. A further one of the functions is to acquire a current waiting situation from the transmission queue 306 and present the current waiting situation. The remaining one of the functions is to issue a request for transmission of reception data to the transmission queue 306.

3-3. Computer (High Order Monitoring Apparatus)

Figure 9:
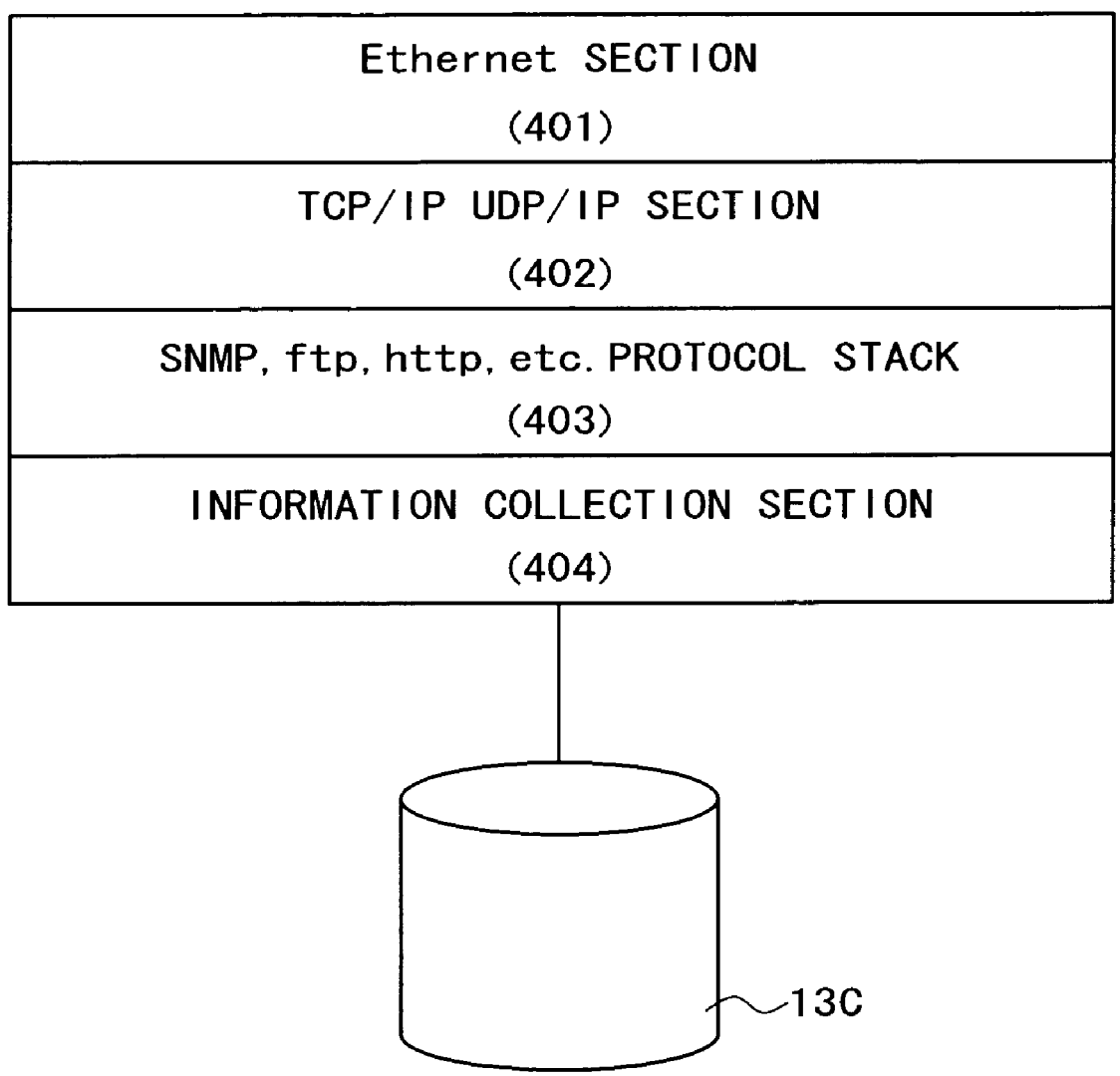
FIG. 9 is a view illustrating the substance of processes executed by a high order monitoring apparatus.

FIG. 9 illustrates a software configuration of the computer 13 which functions as the high order monitoring apparatus.

An Ethernet section 401 and a TCP/IP UDP/IP section 402 are similar those of the software configuration of the electronic apparatus 11.

A protocol stack 403 is a software set including layered protocols necessary to implement certain functions on the network. For example, SNMP software, ftp software and http (Hypertext Transfer Protocol) software are used. The protocol stack 403 is used upon remote operation of or upon information collection from a low order monitoring apparatus. Further, the protocol stack 403 is used also to transmit firmware to a particular electronic apparatus 11 of a monitoring object.

An information collection section 404 analyzes various kinds of information of an electronic apparatus, which is under the monitoring thereof, acquired through a low order monitoring apparatus and presents a result of the analysis to a manager. The presentation of information to the manager is performed through the GUI. A known technique is used for contents of the presentation and a presentation method. It is to be noted that information collected from the low order monitoring apparatus and electronic apparatus is stored into a database. The database is implemented using an area of the sub storage apparatus 13C.

4. Apparatus Management Information

FIG. 10 illustrates an example of the apparatus management information. More particularly, FIG. 10 illustrates apparatus management information where an electronic apparatus 11 is a recorder integrated with a camera. The apparatus management information is stored in each of the electronic apparatus 11 as a monitoring object. For contents or a presentation form of the apparatus management information, those unique to the type, model, maker and so forth of the electronic apparatus 11 are used. It is to be noted that, where the high order monitoring apparatus manages a large number of devices, preferably the contents and the representation form of the apparatus management information are unified among all devices.

The apparatus management information has a layered structure. The apparatus management information can be divided into information (static information) whose contents do not vary irrespective of the operation situation of the electronic apparatus and information (dynamic information) whose contents vary in response to the operation situation of the electronic apparatus.

The static information is classified, for example, for each device in the electronic apparatus. For example, the static information is divided into information of a deck and information of a battery. In the items, information unique to the device such as a model name and a serial number is managed.

The dynamic information is classified into a current state, an operation log in the past, a self-diagnosis command and a setup command.

For example, to the current state, a battery, a viewfinder, a camera, a deck and so forth are classified. Those items are further fragmented into middle items and minor items. Further, for each item, a unit, substance, presence/absence of dealing with self-diagnosis, and presence/absence of dealing with external setup are recorded.

Further, for example, with regard to the operation log in the past, it is fragmented into an operation log, an error rate log, a camera log and a deck log (log of mechanical portions). In those logs, those unique to the items are stored.

Further, for example, a result of self-diagnosis executed is placed into the self-diagnosis command, and a result of collective writing is placed into the setup command.

5. Directory Data

FIG. 11 illustrates an example of directory data held by the computer 13 which is the high order monitoring apparatus. As described hereinabove, the electronic apparatus 11 which are an object of monitoring do not exist on the wide area network. Therefore, in order for the high order monitoring apparatus to communicate with a particular electronic apparatus 11, it is necessary for the high order monitoring apparatus to specify a low order monitoring apparatus to which the individual electronic apparatus 11 belongs.

This problem is solved, for example, with a coordination table illustrated in FIG. 11. The coordination table is implemented by specifying each individual electronic apparatus with a peculiar name and coordinating an IP address of a low order monitoring apparatus of the electronic apparatus with the electronic apparatus. In other words, an electronic apparatus as a target device is distinguished with the name. However, according to the method just described, it is necessary for the peculiar name of each electronic apparatus to be unique in the entire system. For example, the product name and the serial number of a target device are combined to produce a peculiar name.

In FIG. 11, information of a low order monitoring apparatus is added to secure the uniqueness. For example, "TargetDeviceNo1" in FIG. 11 is the combination part of a product name and a serial number, and for example, "OnProbe1" is the information part of a low order management apparatus.

The contents of the coordination table may be fixed or may be updated. Updating of the coordination table by the high order monitoring apparatus is executed when a notification of device information is received from a low order monitoring apparatus. Notification of device information from a low order monitoring apparatus to the high order monitoring apparatus is executed, for example, when the low order monitoring apparatus is connected to the high order monitoring apparatus. Further, notification of device information from the low order monitoring apparatus to the high order monitoring apparatus is executed, for example, when a variation is confirmed in a monitored device.

Conformation of the variation is executed using an automatic discovery function of the SNMP protocol incorporated in the low order monitoring apparatus. By the function, the low order monitoring apparatus can immediately detect a variation of a monitored device and notify the high order monitoring apparatus of the variation.

Further, the coordination table can manage also whether or not a device being monitored by a low order monitoring apparatus exists on the network. This is represented by an actual presence flag in FIG. 11. By referring to the actual presence flag, the high order monitoring apparatus can eliminate wasteful communication.

6. Communication Operation

In the following, communication operations of the individual functions are described.

6-1. Reading Out of Internal State Data by the Computer 12

Figure 12:
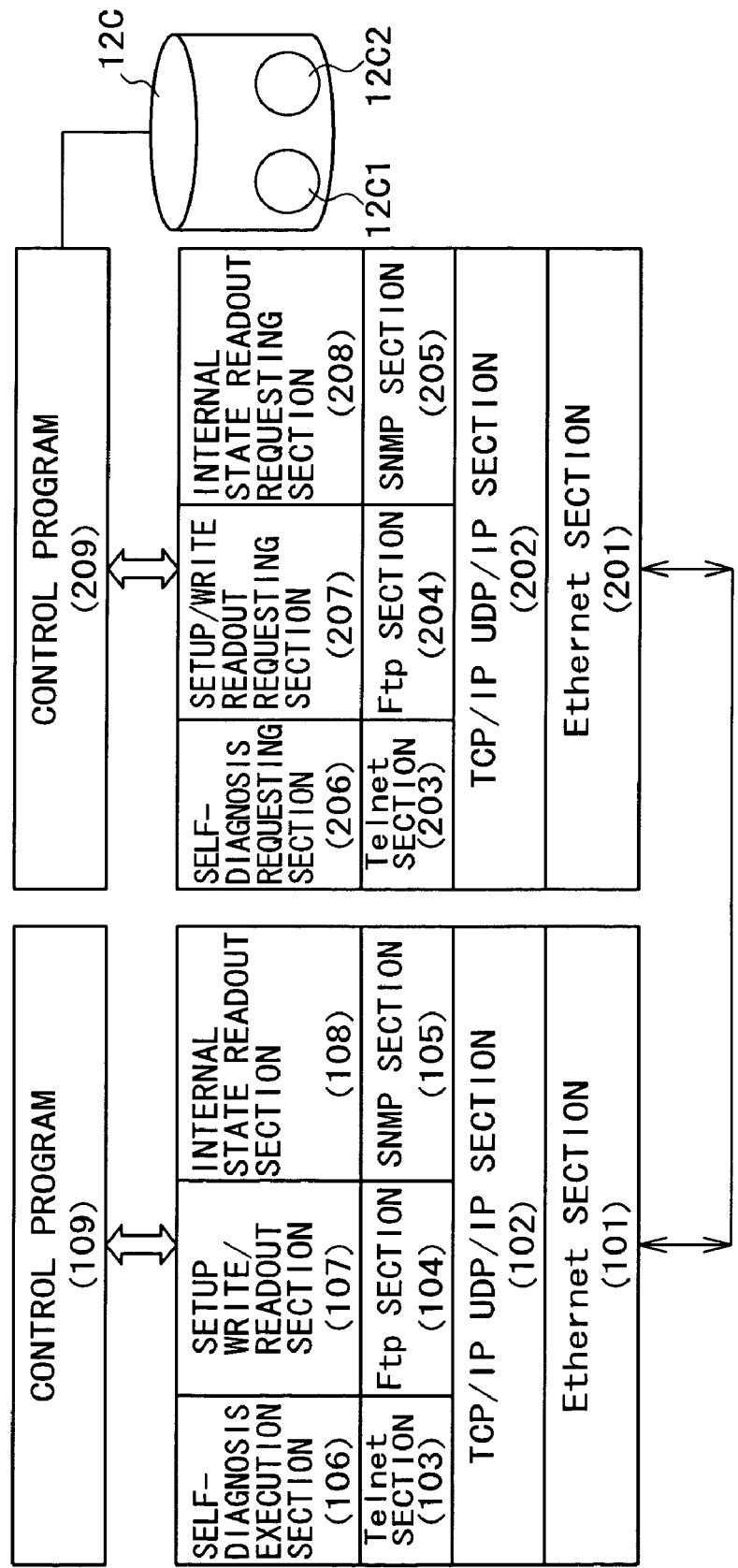
FIG. 12 is a diagrammatic view illustrating a communication procedure between the low order monitoring apparatus and the electronic apparatus.

FIG. 12 illustrates a portion of a program which relates to the function. The operation described below is executed where an electronic apparatus 11 and a computer 12 are connected to each other through the Ethernet.

The control program 209 calls the internal state readout requesting section 208 after every fixed interval of time. The internal state readout requesting section 208 prepares a command for reading out a current situation of a device of a target (for example, a recorder integrated with a camera). The prepared command is given to the SNMP section 205. The SNMP section 205 adds a necessary header to the command and supplies the resulting command to as an SNMP packet to the TCP/IP UDP/IP section 202.

The TCP/IP UDP/IP section 202 converts the SNMP packet into network data (UDP packet) and supplies the network data to an Ethernet section 201. Thereafter, the UDP packet is outputted to the network through the Ethernet section 201.

The Ethernet section 101 of the target device sends the UDP packet to the TCP/IP UDP/IP section 102. The UDP packet in this instance is an SNMP packet. Accordingly, the TCP/IP UDP/IP section 102 sends the received SNMP packet to the SNMP section 205. The SNMP section 205 supplies the received SNMP packet to the internal state readout requesting section 208 which is in the higher processing layer. The internal state readout requesting section 208 interprets the contents of the received command and supplies the contents of the command to the control program 209.

The control program 209 arranges internal state data thereof in accordance with the requesting command. Thereafter, the internal state data are transmitted back reversely along the same path as that described above. In other words, the internal state data are sent through the network back to the control program 209 of the computer 12 which functions as a low order monitoring apparatus. The control program 209 stores the returned internal state data into a corresponding one of the databases.

It is to be noted that the databases are formed in an area of the sub storage apparatus 12C (for example, hard disk apparatus). The data bases include a state retaining database 12C1 and a log data retaining database 12C2.

6-2. Reading Out of Log Data by the Computer 12

Incidentally, a log of an internal operation, a log of an operation situation and so forth cannot be read out singly with an SNMP command. In such an instance, the control program 209 uses an ftp command.

The control program 209 calls the internal state readout requesting section 208 after every fixed interval of time. The internal state readout requesting section 208 prepares a command for reading out log information in the past of a device of a target.

The prepared command is supplied to the ftp section 204. The ftp section 204 adds a necessary header to the command and supplies the resulting command as an ftp packet to the TCP/IP UDP/IP section 202.

The TCP/IP UDP/IP section 202 converts the ftp packet into network data (TCP packet) and supplies the TCP packet to the Ethernet section 201. Thereafter, the TCP packet is outputted to the network through the Ethernet section 201.

The Ethernet section 101 of the target device sends the TCP packet to the TCP/IP UDP/IP section 102. The TCP packet in this instance is an ftp packet. Accordingly, the TCP/IP UDP/IP section 102 sends the received ftp packet to the ftp section 104. The ftp section 104 supplies the received ftp packet to the internal state readout section 108 which is in the upper processing layer. The internal state readout section 108 interprets the contents of the received command and supplies the contents to the control program 109.

The control program 109 arranges log data in accordance with the requesting command. Thereafter, the log data are transmitted back reversely along the same path as that described above. In short, the log data are transmitted through the network back to the control program 209 of the computer 12 which functions as a low order monitoring apparatus. The control program 209 stores the returned log data into the corresponding database.

6-3. Reading Out of Setting Situation Data by the Computer 12

Also where a setting situation of a target device is to be read out, a sequence basically similar to that described hereinabove in paragraph 6-1 is used. In this instance, the computer 12 uses the setup write/readout requesting section 207 in place of the internal state readout requesting section 208 in the sequence described hereinabove. Further, the electronic apparatus 11 uses the setup write/readout section 107 in place of the internal state readout section 108.

6-4. Rewriting of Setting Situation Data/Alteration of Operation Situation by the Computer 12

The communication operation in this instance is similar to that of the sequence described above in paragraph 6-3. In particular, setting situation data prepared by the control program 209 are given to an electronic apparatus 11 of a target through the setup write/readout requesting section 207.

Then, the electronic apparatus 11 as a target passes the received SNMP packet to the control program 109 through the setup write/readout section 107. Thereafter, the control program 109 rewrites the setting situation data in accordance with the received command.

6-5. Calling of the Self-Diagnosis Program and Reading Out of the Execution Result The communication operation in this instance is started when the computer 12 sends a self-diagnosis command to an electronic apparatus 11 of a target.

The control program 209 calls the self-diagnosis requesting section 206 as occasion demands. The self-diagnosis requesting section 206 prepares a command for causing the target device to carry out self-diagnosis.

The prepared command is supplied to the telnet section 203. The telnet section 203 adds a necessary header to the command and supplies the resulting command as a Telnet packet to the TCP/IP UDP/IP section 202. The TCP/IP UDP/IP section 202 converts the Telnet packet into network data (TCP packet) and supplies the network data to the Ethernet section 201. Thereafter, the TCP packet is outputted to the network through the Ethernet section 201.

The Ethernet section 101 of the target device sends the TCP packet to the TCP/IP UDP/IP section 102. The TCP packet in this instance is a Telnet packet. Accordingly, the TCP/IP UDP/IP section 102 sends the received Telnet packet to the telnet section 103. The telnet section 103 supplies the received Telnet packet to the self-diagnosis execution section 106 which is in a higher processing layer.

The self-diagnosis execution section 106 interprets the contents of the received command and supplies the interpreted contents to the control program 109. The control program 109 performs self-diagnosis in accordance with the requesting command and arranges internal state data of a result of the self-diagnosis. Thereafter, the internal state data are transmitted back reversely along the same path as that described above. In short, the internal state data return through the network to the control program 209 of the computer 12 which functions as a low order monitoring apparatus. The control program 209 stores the returned internal state data into the corresponding database.

6-6. Periodical Notification of Apparatus Management Information to the High Order Monitoring Apparatus by the Computer 12

Figure 13:
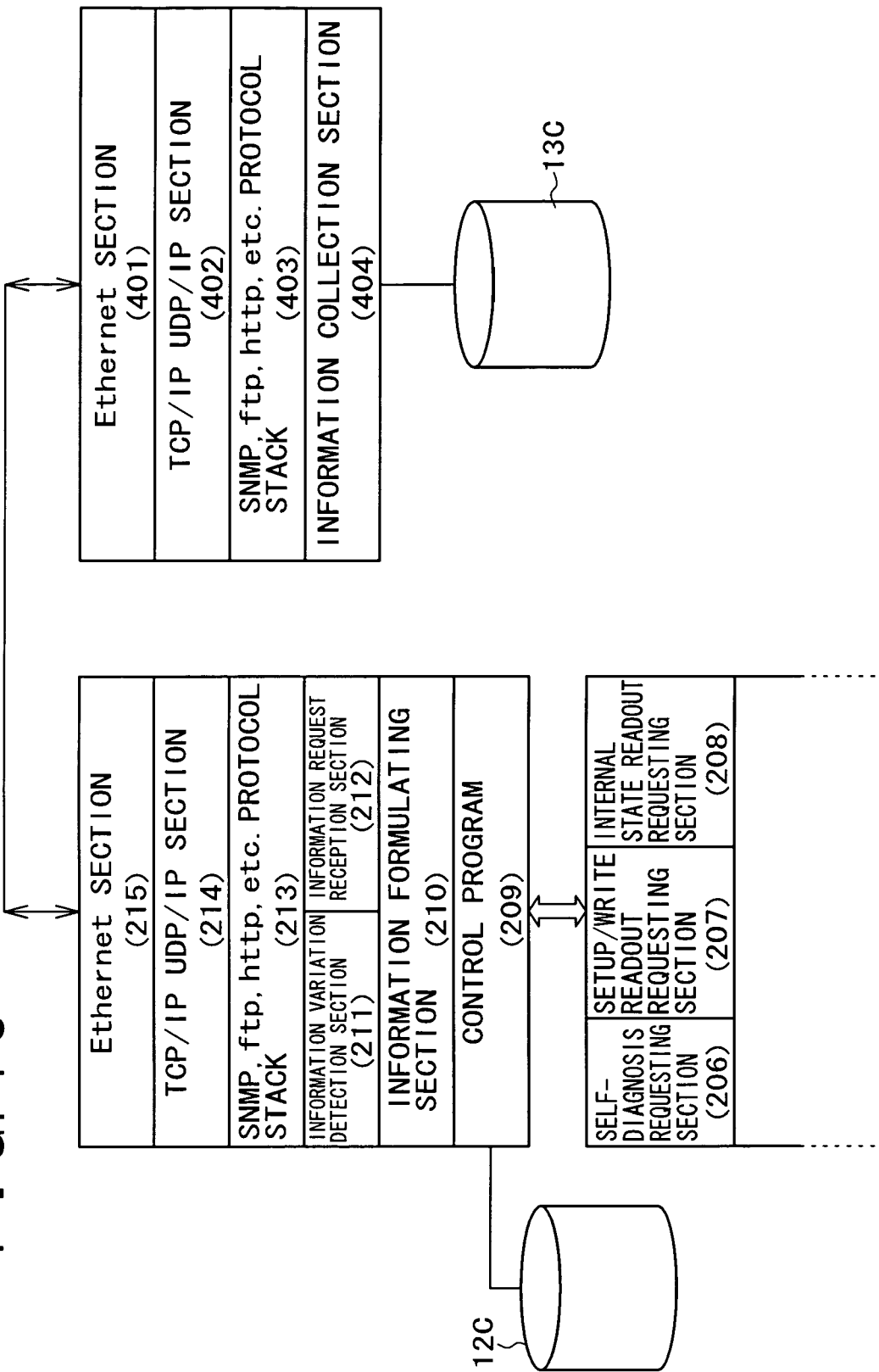
FIG. 13 is a diagrammatic view illustrating a communication procedure between the high order monitoring apparatus and the low order monitoring apparatus.

FIG. 13 illustrates a portion of a program which relates to this function. The following operation is executed where the computers 12 and 13 are connected to each other through the Ethernet. It is assumed that the computers 12 and 13 are in a mutually communicatable state using the network communication function sections 213 to 215 and 401 to 403 described hereinabove.

As described hereinabove, the computer 12 retains apparatus management information of the electronic apparatus 11 collected periodically in the form of a database. The control program 209 of the computer 12 accesses the database to read out the apparatus management information of the target device from the database. Here, the control program 209 prepares the apparatus management information in the form as read out or prepares apparatus management information having a data structure converted by the information formulating section 210. The prepared data are outputted to the network through the network communication function sections 213 to 215.

6-7. Notification of Apparatus Management Information to the High Order Monitoring Apparatus in Accordance with a Request from the Computer 13

This operation is executed when the computer 13 which is a high order monitoring apparatus issues a request for apparatus monitoring information to the computer 12 which is a low order monitoring apparatus.

The information collection section 404 of the computer 13 issues, periodically or as occasion demands, a request for apparatus management information of a target device to the computer 12. This request may be made for an individual piece of information.

The requesting command is converted into network data by the network communication function sections 403 to 401. The requesting command is transmitted to a particular low order monitoring apparatus by which the target device is managed. The requesting command is transmitted to the information request reception section 212 of the computer 12 of the destination of the requesting command through the network communication function sections 215 to 213. The information request reception section 212 interprets the contents of the received command and supplies the interpreted contents to the control program 209.

The control program 209 reads out apparatus management information from the database in accordance with the request. The read out apparatus management information is supplied to the network communication function sections 213 to 215 while a data structure of the data as read out is maintained or after the data structure of the data is converted into the unitary data structure. Thereafter, the apparatus management information follows the same path as that described hereinabove but reversely and returns to the information collection section 404 of the computer 13 which functions as the high order monitoring apparatus. The information collection section 404 stores the received apparatus management information into the database. The database is an area of the sub storage apparatus 13C (for example, hard disk apparatus).

6-8. Immediate Notification of Acquired Apparatus Management Information to the High Order Monitoring Apparatus Based on a Result of Inspection The computer 12 uses the information variation detection section 211 to monitor the contents of apparatus management information acquired from an electronic apparatus 11 which is managed thereby. The monitoring is executed always or periodically. The information variation detection section 211 detects whether or not the contents of acquired apparatus management information indicate a variation determined in advance.

For example, the information variation detection section 211 detects whether or not the cumulative use time period of a certain piece of hardware (for example, the deck) of an electronic apparatus 11 of a monitoring object is equal to or longer than a fixed period of time. Or, for example, the information variation detection section 211 detects whether or not a result of measurement of the self-diagnosis indicates some abnormal state. If the predetermined variation is detected, then the information variation detection section 211 autonomously notifies the high order monitoring apparatus of the apparatus management information. The information collection section 404 of the computer 13 stores the received apparatus management information into the database.

6-9. Direct Communication Between the Electronic Apparatus and the High Order Monitoring Apparatus Using the Data Repeating Section Two communication directions are used including a communication direction from the high order monitoring apparatus to an electronic apparatus and the other communication direction from the electronic apparatus to the high order monitoring apparatus. In communication in each direction, two cases are available including a case wherein the data communication completes immediately and the other case wherein communication data resides in the data repeating section 300.

Figure 14:
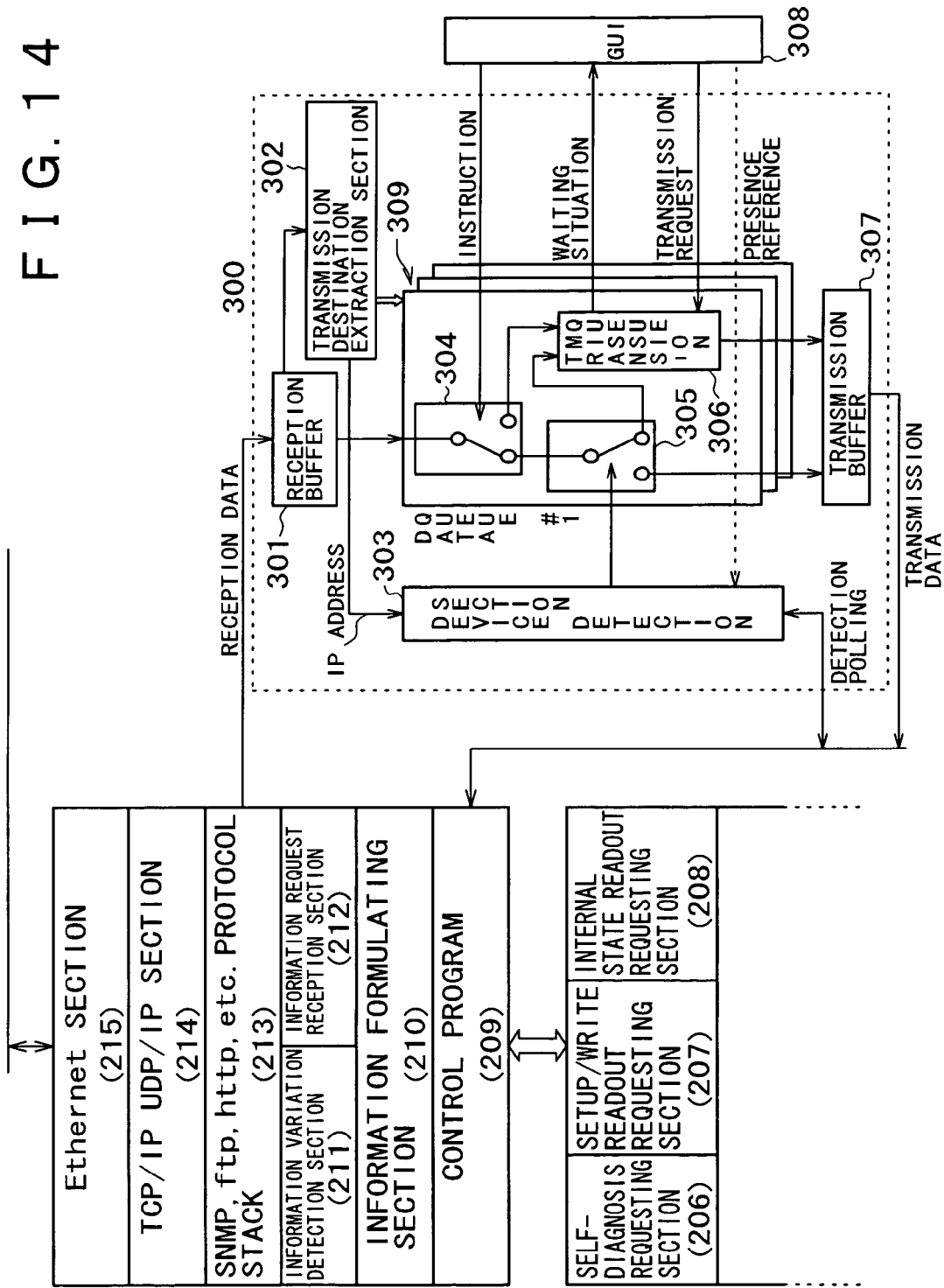
FIG. 14 is a diagrammatic view illustrating a communication procedure of direct communication between the high order monitoring apparatus and a target device.

In the case of communication in any of the communication directions, the communication is executed in a similar procedure. In the following, transmission of firmware data from the computer 13 to a particular electronic apparatus 11 is described. FIG. 14 illustrates a portion of a program relating to the repeating function.

It is to be noted that, upon such communication, the information collection section 404 of the computer 13 refers to the coordination table described hereinabove to cause the transmission data to clearly indicate that the transmission data are "destined for the target device" and transmits the resulting transmission data.

When the low order monitoring apparatus receives the transmission data through the network, it supplies the transmission data to the data repeating section 300 through the protocol stack 213.

Figure 15:
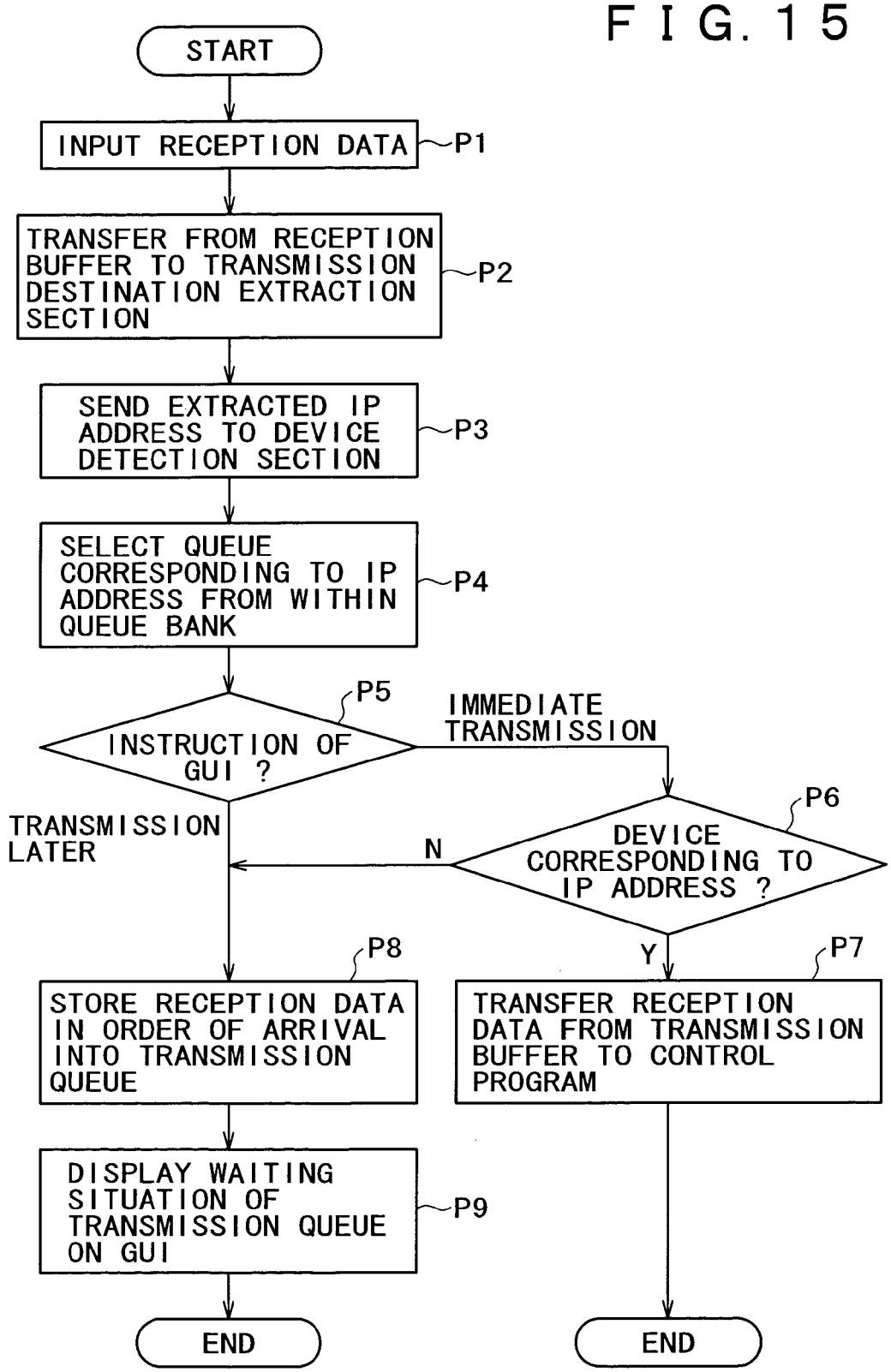
FIG. 15 is a flow chart illustrating a repeating processing procedure of transmission data destined for the target device transmitted from the high order monitoring apparatus.

FIG. 15 illustrates a process until the reception data are immediately transferred to the particular electronic apparatus 11. Referring to FIG. 15, the data repeating section 300 inputs the reception data to the reception buffer section 301 (step P1). The reception buffer section 301 transfers the reception data to the transmission destination extraction section 302 (step P2). The transmission destination extraction section 302 extracts transmission destination information (IP address) from within the reception data and supplies the extracted transmission destination information to the device detection section 303 (step P3).

Further, the transmission destination extraction section 302 selects a data queue corresponding to the extracted transmission destination information (IP address) from among the queue banks 309 (step P4). FIG. 14 illustrates a state wherein the first data queue is selected.

The data queue decides an output destination of the reception data in accordance with contents of an instruction of the GUI 308 (step P5). For example, if the contents of the instruction of the GUI 308 indicate immediate transmission, then the output terminal of the switch 304 is changed over to the switch 305.

Then, the data queue determines an output designation of the reception data in accordance with a result of the detection of the device detection section 303 (step P6). It is to be noted that the device detection section 303 normally performs confirmation of the presence of a device corresponding to the IP address. The confirmation of the presence is performed, for example, through polling communication using the Ping command.

Here, if a device corresponding to the IP address exists, then the output terminal of the switch 305 is changed over to the transmission buffer 307.

As a result, the reception data are transferred from the transmission buffer 307 to the control program 209 (step P6). In other words, the reception data are transferred immediately.

On the other hand, if the contents of the instruction of the GUI indicate later transmission, then the output terminal of the switch 304 is changed over to a transmission queue 306. Further, when a device corresponding to the IP address does not exist, the output terminal of the switch 305 is changed over to the transmission queue 306.

In those cases, the data queue stores the reception data in order of arrival into the transmission queue 306 (step P8).

Where the transmission queue 306 has some reception data stored therein, the data queue displays a waiting situation on the GUI 308 (step P9). Transmission of the reception data stored in the transmission queue 306 is reserved until after a transmission request is received from the GUI 308.

Figure 16:
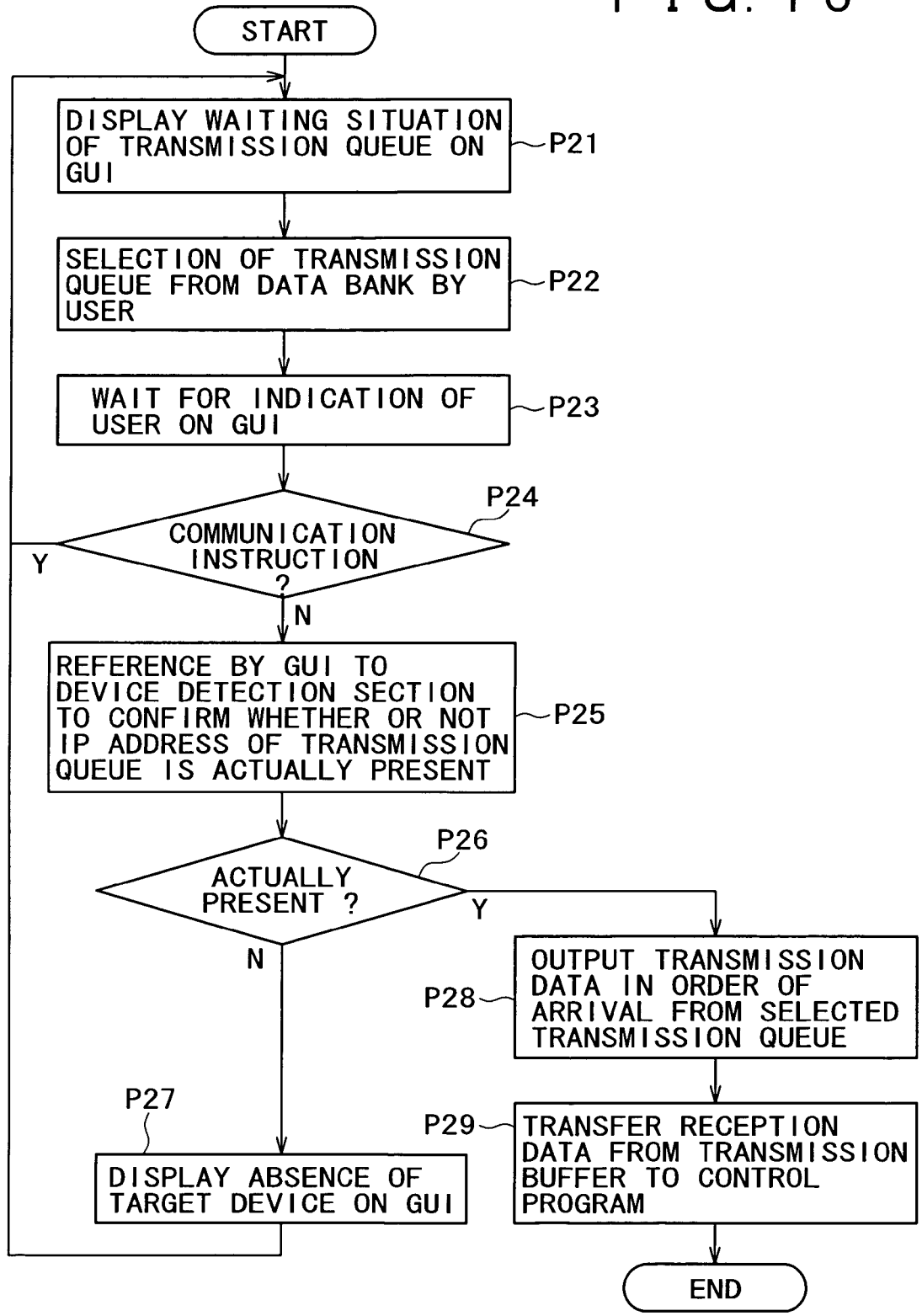
FIG. 16 is a flow chart illustrating a repeating processing procedure where the transmission data destined for the target device transmitted from the high order monitoring apparatus resides at a transmission queue.

FIG. 16 illustrates operation until reception data in a transmission waiting state are transmitted. Referring to FIG. 16, the GUI 308 displays a waiting situation of the transmission queues 306 (step P21). In this state, the user would select a transmission queue 306 to be made an object of indication from among the queue banks 309 (step P22).

The GUI 308 waits that the user inputs an instruction to the transmission queue 306 selected by the user (step P23).

If some instruction is received, then the GUI 308 discriminates whether or not the contents of the instruction of the user are a transmission request (step P24).

If the contents of the instruction are not a transmission request, then the GUI 308 restores the state wherein the waiting situation of the transmission queues 306 is displayed (step P21). On the other hand, if the contents of the instruction are a transmission request, then the GUI 308 refers to the result of the detection of the device detection section 303 (step P25). Then, the GUI 308 confirms whether or not the IP address which makes a determination of transmission actually exists (step P26).

If the IP address does not exist, then since no target device actually exists (is connected), GUI 308 displays that transmission cannot be carried out at preset (step P27). Thereafter, the processing of the GUI 308 returns to step P21.

On the other hand, if the IP address exists (is connected), then the GUI 308 issues a transmission request to the selected transmission queue 306 (step P28). Consequently, the reception data stored in the transmission queue 306 are taken out in order of arrival at the transmission queue 306.

The reception data read out from the transmission queue 306 are written into the transmission buffer 307. As a result, the reception data are transferred from the transmission buffer 307 to the control program 209 (step P29). In other words, the reception data are placed into a state wherein they can be transmitted to the electronic apparatus 11, and then are transmitted after an instruction of the user is waited.

In this manner, where the data repeating section 300 is used, even if a device of a communication destination is not physically connected to the low order monitoring apparatus, the transmission data can reside in the data repeating section 300. Then, after the device of the communication destination is placed into physical connection to the low order monitoring apparatus, the transmission data residing in the data repeating section 300 can be transmitted anew.

This signifies that, as viewed from the high order monitoring apparatus, a state wherein it is kept connected physically to the target device irrespective of an actual connection situation of the target device is established.

This can provide an effect that, even in a situation wherein, while the target device is a portable apparatus and actually is not connected physically to the low order monitoring apparatus, the high order monitoring apparatus cannot discriminate whether or not the target device is actually connected to the low order physical apparatus, they are connected directly to each other.

It is to be noted that also communication from an electronic apparatus to the high order monitoring apparatus can be implemented similarly. In this instance, the electronic apparatus transmits transmission data to the low order monitoring apparatus clearly indicating that the transmission data are destined for the high order monitoring apparatus. The control program 209 interprets the reception data and applies a wide area network address of the high order monitoring apparatus corresponding to the electronic apparatus which is a source of the transmission to the reception data.

However, where only one high order monitoring apparatus is involved in the system or it is set in advance that transmission is performed only to a particular high order monitoring apparatus, a particular wide area network address is applied fixedly.

Incidentally, where the low order monitoring apparatus and the high order monitoring apparatus are in a state wherein they cannot communicate with each other, the transmission data are caused to reside in the data repeating section 300. Then, at a point of time when communication is enabled, the transmission data are transmitted in response to an instruction of the GUI 308.

7. Effects of the Invention

Where the system described above is used, a device which is used in a state wherein it is not connected to the wide area network can be remotely managed. In particular, a log of an internal operation, a log of an operation situation, a current state or an apparatus setting situation stored in a device, can be collected into the high order monitoring apparatus through the low order monitoring apparatus.

Consequently, a current situation in the inside of the device can be read out from a remote place. Thus, a cause of a trouble such as an error in a method of use can be grasped from the remote place. Further, it can be grasped from the remote place whether the trouble is a trouble which can be repaired through remote operation or is a trouble which requires physical repair. Furthermore, an operation situation of the assets can be grasped particularly. As a result, a schedule of efficient inspection and maintenance can be made. Consequently, also the operation ratio of the device can be raised. Also smoothing of machines and materials and personnel required for the inspection and maintenance can be anticipated.

Further, where the system described above is used, the setting state of a particular device can rewritten or the operation situation can be changed as occasion demands. Consequently, a trouble arising from an error in setting can be prevented from a remote place.

Further, where the system described above is used, a self-diagnosis program provided in a particular device can be called as occasion demands. Consequently, a cause of a trouble can be grasped in detail from a remote place.

Further, where the system described above is used, a data structure of apparatus management information to be transmitted to the high order monitoring apparatus can be converted into a unitary data structure. Consequently, various kinds of electronic apparatus can be monitored in a standardized fashion.

Further, where the system described above is used, if an abnormal state or a particular event is found in an object of monitoring, then contents of the same can be conveyed immediately to the high order monitoring apparatus. Consequently, quick solution to the trouble can be anticipated.

Further, where the system described above is used, it is possible for data to reside in the data repeating section, and artificial direct communication with a device which is used in a non-connected state to the wide area network can be achieved.

Further, where the system described above is used, version-up of firmware of a device which is used in a non-connected state to the wide area network can be performed. Consequently, the firmware of the device can be normally managed to up-to-date firmware.

While preferred embodiments of the present invention have been described using specific terms, such description is for illustrative purposes only, and it is to be understood that changes and variations may be made without departing from the spirit or scope of the following claims.

What is claimed is:

1. A remote monitoring system, comprising:
   an electronic apparatus, the electronic apparatus having a removable storage medium, a self-diagnosis unit configured to test hardware elements of the electronic apparatus, and a local network interface, the removable storage medium including apparatus management information including an operation log and dynamic setting information of the electronic apparatus;
   a low order monitoring apparatus including an information variation detection section and having the local network interface, configured to connect to a wide area network, and to connect to the electronic apparatus by the local network interface, to receive and store apparatus management information including the operation log and the dynamic setting information from the electronic apparatus; and
   a high order monitoring apparatus configured to receive and monitor the operation log and the dynamic setting information of the apparatus management information acquired from said low order monitoring apparatus by the wide area network,
   wherein the low order monitoring apparatus is configured to acquire the apparatus management information of the electronic apparatus upon connection of the low order monitoring apparatus with the electronic apparatus by the local network interface, is configured to store the apparatus management information in a buffer, when the low order monitoring apparatus and the high order monitoring apparatus are not connected with each other by the wide area network, and is configured to send a notification including the apparatus management information through said wide area network to the high order monitoring apparatus, when the high order monitoring apparatus and the low order monitoring apparatus are connected with each other by the wide area network, wherein the electronic apparatus cannot connect to the wide area network, wherein the low order monitoring apparatus is further configured to send a request for a self-diagnosis to the self-diagnosis unit of the electronic apparatus, and to acquire a result of the self-diagnosis that is included in the apparatus management information, and wherein the information variation detection section is configured to analyze the results of the self diagnosis of the electronic apparatus included in the apparatus management information, and to verify whether a hardware element of the electronic apparatus has been used longer than a prescribed period of time.

2. The remote monitoring system according to claim 1, wherein the low order monitoring apparatuses further comprises:

a coordination table defining a link between a device identification of the electronic apparatus, and a device identification of the low order monitoring apparatus, for identification and location of the electronic apparatus at the high order monitoring apparatus.

3. The remote monitoring system according to claim 2, wherein the high order monitoring apparatus is configured to instruct the low order monitoring apparatus to update the coordination table, upon receipt of the notification from the low order monitoring apparatus.

4. The remote monitoring system according to claim 1, wherein the high monitoring apparatus periodically sends requests to the low order monitoring apparatus to request all the apparatus management information from a plurality of electronic apparatuses that are managed by the low order monitoring apparatus.

5. A remote monitoring method performed on a system including an electronic apparatus having a removable non-transitory storage medium and a local network interface, the removable storage medium including apparatus management information with an operation log and dynamic setting information of the electronic apparatus, a low order monitoring apparatus having the local network interface, connecting to a wide area network and connecting to the electronic apparatus by the local network interface, to receive and store apparatus management information from the electronic apparatus, and a high order monitoring apparatus receiving and monitoring the apparatus management information acquired from said low order monitoring apparatus by the wide area network, the electronic apparatus cannot connect to the wide area network, said method comprising the steps of:

sending the apparatus management information, including the operation log and the dynamic setting information of the electronic apparatus, from the electronic apparatus to the low order monitoring apparatus, upon connection of the low order monitoring apparatus with the electronic apparatus by the local network interface;

storing the apparatus management information in a buffer at the low order monitoring apparatus, when the low order monitoring apparatus and the high order monitoring apparatus are not connected with each other by the wide area network;

sending a notification including the apparatus management information from said low order monitoring apparatus to the high order monitoring apparatus through said wide area network, when the high order monitoring apparatus and the low order monitoring apparatus are connected with each other by the wide area network;

sending a request for a self-diagnosis from the low order monitoring apparatus to a self-diagnosis unit of the electronic apparatus;

performing a self-diagnosis by the self-diagnosis unit to test hardware elements of the electronic apparatus;

acquiring a result of the self-diagnosis that is included in the apparatus management information by the low-monitoring apparatus;

analyzing the results of the self diagnosis of the electronic apparatus by an information variation detection section of the low order monitoring apparatus; and verifying whether a hardware element of the electronic apparatus has been used longer than a prescribed period of time.

6. The remote monitoring method according to claim 5, further comprising the step of:

managing a coordination table at the low order monitoring apparatus, the coordination table defining a link between a device identification of the electronic apparatus, and a device identification of the low order monitoring apparatus, for identification and location of the electronic apparatus at the high order monitoring apparatus.

7. The remote monitoring method according to claim 6, further comprising the step of:

instructing the low order monitoring apparatus by the high order monitoring apparatus to update the coordination table, upon receipt of the notification from the low order monitoring apparatus.

8. The remote monitoring method according to claim 5, further comprising the step of:

sending periodical requests from the high monitoring apparatus to the low order monitoring apparatus to request all the apparatus management information from a plurality of electronic apparatuses that are managed by the low order monitoring apparatus.

9. A low order monitoring apparatus, configured to connect to an electronic apparatus by a local network interface, and configured to connect to a high order monitoring apparatus by a wide area network, the electronic apparatus including a self-diagnosis unit configured to test hardware elements of the electronic apparatus and a removable non-transitory storage medium having apparatus management information including the operation log and the dynamic setting information of the electronic apparatus, the electronic apparatus cannot connect to the wide area network, the low order monitoring apparatus comprising:

a reception unit configured to acquire the apparatus management information including the operation log and the dynamic setting information of the electronic apparatus upon connection of the low order monitoring apparatus with the electronic apparatus by the local network interface, a buffer for storing the apparatus management information, when the low order monitoring apparatus and the high order monitoring apparatus are not connected with each other by the wide area network, a transmission unit configured to send a notification including the apparatus management information through said wide area network to the high order monitoring apparatus, when the high order monitoring apparatus and the low order monitoring apparatus are connected with each other by the wide area network,
- a control unit configured to send a request for a self-diagnosis to the self-diagnosis unit of the electronic apparatus, and to acquire a result of the self-diagnosis that is included in the apparatus management information, and
- an information variation detection section configured to analyze the results of the self diagnosis of the electronic apparatus included in the apparatus management information, and to verify whether a hardware element of the electronic apparatus has been used longer than a prescribed period of time.

10. The low order monitoring apparatus according to claim 9, further comprising:
- a coordination table defining a link between a device identification of the electronic apparatus, and a device identification of the low order monitoring apparatus, for identification and location of the electronic apparatus at the high order monitoring apparatus.

11. The low order monitoring apparatus according to claim 10, the reception unit further configured to receive an instruction from the high order monitoring apparatus to update the coordination table, after the low order monitoring apparatus sends the notification to the high order monitoring apparatus.

12. The low order monitoring apparatus according to claim 9, the reception unit further configured to receive periodical requests from the high order monitoring apparatus to request all the apparatus management information from a plurality of electronic apparatuses that are managed by the low order monitoring apparatus, and
- the transmission unit is further configured to send all the apparatus management information to the high order monitoring apparatus, after receiving a periodical request.

13. A computer readable non-transitory storage medium having computer instructions recorded thereon, the computer instructions configured to perform a method on a low order monitoring apparatus when executed by at least one processor on the low order monitoring apparatus, the low order monitoring apparatus configured to connect to an electronic apparatus by a local network interface, and configured to connect to a high order monitoring apparatus by a wide area network, the electronic apparatus including a removable storage medium having apparatus management information including the operation log and the dynamic setting information of the electronic apparatus, the electronic apparatus cannot connect to the wide area network, the method performing the steps of:
- acquiring the apparatus management information including the operation log and the dynamic setting information of the electronic apparatus upon connection of the low order monitoring apparatus with the electronic apparatus by the local network interface,
- storing the apparatus management information in a buffer, when the low order monitoring apparatus and the high order monitoring apparatus are not connected with each other by the wide area network, and
- sending a notification including the apparatus management information through said wide area network to the high order monitoring apparatus, when the high order monitoring apparatus and the low order monitoring apparatus are connected with each other by the wide area network,
- sending a request for a self-diagnosis to the self-diagnosis unit of the electronic apparatus,
- acquiring a result of the self-diagnosis that is included in the apparatus management information,
- analyzing the results by an information variation detection section of the self diagnosis of the electronic apparatus included in the apparatus management information, and
- verifying whether a hardware element of the electronic apparatus has been used longer than a prescribed period of time.

14. The computer readable non-transitory storage medium according to claim 13, said method further comprising:
- linking a device identification of the electronic apparatus, and a device identification of the low order monitoring apparatus, and storing the link in a coordination table at the low order monitoring apparatus, for identification and location of the electronic apparatus at the high order monitoring apparatus.

15. The computer readable non-transitory storage medium according to claim 14, said method further comprising:
- receiving an instruction from the high order monitoring apparatus to update the coordination table, after the low order monitoring apparatus sends the notification to the high order monitoring apparatus.

16. The computer readable non-transitory storage medium according to claim 13 said method further comprising:
- receiving periodical requests from the high order monitoring apparatus to request all the apparatus management information from a plurality of electronic apparatuses that are managed by the low order monitoring apparatus, and to thereafter send all the apparatus management information to the high order monitoring apparatus.

* * * * *